United States Patent
Paiz et al.

(10) Patent No.: US 10,008,903 B2
(45) Date of Patent: Jun. 26, 2018

(54) ENERGY STORAGE MANAGEMENT SYSTEM

(71) Applicant: Saint-Augustin Canada Electric Inc., Saint-Augustin de Desmaures (CA)

(72) Inventors: Matt Paiz, Poway, CA (US); Eric Martinez, Poway, CA (US); Ton Nguyen, Poway, CA (US); Khang Nguyen, Poway, CA (US)

(73) Assignee: Saint-Augustin Canada Electric Inc., Quebec (CA)

( * ) Notice: Subject to any disclaimer, the term of this patent is extended or adjusted under 35 U.S.C. 154(b) by 0 days. days.

(21) Appl. No.: 14/852,508

(22) Filed: Sep. 12, 2015

(65) Prior Publication Data

US 2016/0079826 A1  Mar. 17, 2016

Related U.S. Application Data

(60) Provisional application No. 62/049,496, filed on Sep. 12, 2014.

(51) Int. Cl.
| | | |
|---|---|---|
| *H02K 7/02* | (2006.01) | |
| *H02K 5/22* | (2006.01) | |
| *H02K 5/16* | (2006.01) | |
| *H02J 15/00* | (2006.01) | |

(52) U.S. Cl.
CPC ............. *H02K 7/025* (2013.01); *H02K 5/161* (2013.01); *H02K 5/22* (2013.01); *H02J 15/00* (2013.01); *Y02E 60/16* (2013.01)

(58) Field of Classification Search
USPC ........................ 318/161, 150, 400.12, 400.31
See application file for complete search history.

(56) References Cited

U.S. PATENT DOCUMENTS

| | | | | |
|---|---|---|---|---|
| 6,175,172 B1* | 1/2001 | Bakholdin | ............. | B60L 11/16 310/74 |
| 7,956,637 B2* | 6/2011 | Lu | ........................... | H02P 23/14 324/765.01 |
| 2003/0023780 A1* | 1/2003 | Husted | ................. | G05B 19/054 710/15 |
| 2008/0164818 A1* | 7/2008 | Ichikawa | ........... | H05B 41/2887 315/77 |
| 2012/0049516 A1* | 3/2012 | Viassolo | ................. | F03D 9/003 290/44 |

OTHER PUBLICATIONS

International Search Report and Written Opinion in International Application No. PCT/US2015/049857, dated Jan. 20, 2016 (15 pages).
European Communication for European Application No. 15840365.9 dated May 30, 2017, 5 pages.

* cited by examiner

*Primary Examiner* — Jorge L Carrasquillo
(74) *Attorney, Agent, or Firm* — TraskBritt

(57) ABSTRACT

An illustrative energy storage system includes an energy storage device, a processor coupled to the energy storage device, and a memory coupled to the processor. The memory is configured to store instructions adapted for execution by the processor to control and monitor operation of the energy storage device. The instructions are arranged into functional modules. Each functional module is associated with a memory cache in the memory. Control processes depending on the functional module read last known values from the associated memory cache. Reading last known values from the associated memory enables changes to the functional modules without shutting down the energy storage device.

7 Claims, 21 Drawing Sheets

ENERGY STORAGE MANAGEMENT SYSTEM

CROSS-REFERENCE TO RELATED APPLICATION

This application claims priority to U.S. Provisional Patent Application No. 62/049,496, filed on Sep. 12, 2014, which is incorporated herein by reference in its entirety.

FIELD

The present disclosure relates generally to the field of kinetic energy storage. More specifically, the present disclosure relates to flywheel energy storage management.

BACKGROUND

The following description is provided to assist the understanding of the reader. None of the information provided or references cited is admitted to be prior art. Energy can be stored in a variety of ways, such as chemical (e.g., hydrogen and biofuels) electrochemical (e.g., batteries), electrical (e.g., capacitors), thermally (e.g., hot water storage), and mechanical (e.g., flywheel). Many energy storage systems include several components. In some instances, difficulties arise when attempting to increase efficiency of a system using various components.

SUMMARY

An illustrative energy storage system includes an energy storage device, a processor coupled to the energy storage device, and a memory coupled to the processor. The memory is configured to store instructions adapted for execution by the processor to control and monitor operation of the energy storage device. The instructions are arranged into functional modules. Each functional module is associated with a memory cache in the memory. Control processes depending on the functional module read last known values from the associated memory cache. Reading last known values from the associated memory enables changes to the functional modules without shutting down the energy storage device.

An illustrative method includes receiving, at a processing device, monitored signals from an energy storage device in operation and communicating control signals with data from a memory cache in shared memory to the energy storage device. The memory cache is associated with one of a plurality of functional modules and the data is provided by instructions in the associated functional module. Each functional module is associated with at least one of a sensor or an actuator. The method also includes receiving, at the processing device, new instructions for one of the plurality of functional modules while the energy storage device is in operation and modifying, by the processing device, instructions for one of the plurality of functional modules based on the received new instructions while the energy storage device is in operation.

An illustrative energy storage system includes a flywheel device, a processor coupled to the flywheel device, a plurality of sensors, and a memory coupled to the processor. The flywheel device includes a housing section, a rotor disposed within the housing section, lower contact bearings and upper contact bearings, each disposed between the rotor and the housing, and an off-loading magnet configured to provide a vertical off-loading force that lifts the rotor against the upper bearings and off of the lower bearings. The memory is configured to store instructions adapted for execution by the processor to control and monitor operation of the flywheel device and store values received from a plurality of modules, wherein each module is associated with one of the plurality of sensors.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The exemplary embodiments will be explained in more detail in the following text with reference to the attached drawings, in which.

Figure 1:
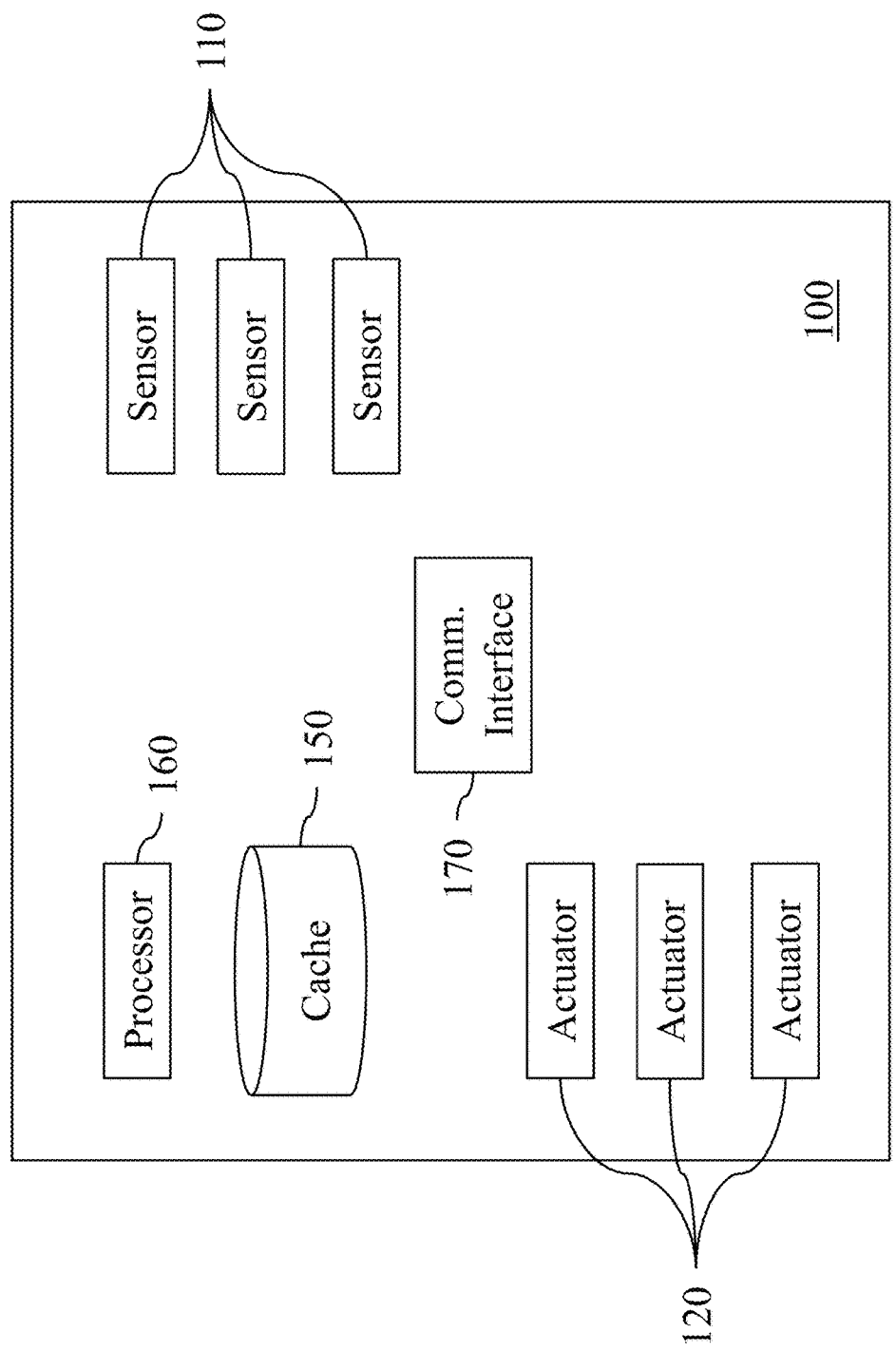
FIG. 1 is a block diagram of an energy storage management system in accordance with an illustrative embodiment.

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, and designed in a wide variety of different configurations, all of which are explicitly contemplated and made part of this disclosure.

With reference to the accompanying figures, the present disclosure relates to kinetic energy storage, specifically flywheel-based energy storage, for use in electrical grids, renewable energy generation systems such as wind turbines, solar panels, tidal machines, and industrial applications where smoothing of power demand reduces capital and operational costs. The present disclosure also relates to methods of producing, controlling, and integrating such storage devices with existing grid and micro-grid energy distribution systems. While the subject matter herein is presented in the context of energy storage devices in the field of grid-scale applications, such devices may be utilized in alternate applications such as stand-alone energy storage for electric vehicle charging stations, rail transportation systems, elevators, cranes, shipboard systems, or any other devices utilizing kinetic energy storage. The implementations described herein are not limited to flywheel-based energy storage, kinetic energy storage, or any energy storage management system.

In most instances, kinetic energy storage systems benefit from using a management system that enables flexible and modular components. Also, in most instances, kinetic energy storage systems benefit from using a management system that automatically creates parameters to increase the efficiencies of the storage system. Flywheel systems, as one example of an implementation, pose unique challenges for testing, development, monitoring, and maintenance because of the systems' large physical characteristics (e.g., weight and size) and because of the time needed to start and stop the systems.

The present disclosure describes various embodiments for an energy storage management system that helps achieve improved performance and improved ease of operation. While the various embodiments are described in the context of flywheel systems, the management system can be implemented with a variety of different technologies and implementations.

There are many applications that would benefit from kinetic energy storage. In some applications of a stationary kinetic energy storage system, cost (to purchase and to operate) is of high importance. Some example applications include frequency-regulation, time-of-use, uninterruptible power supply (UPS), demand response, and smoothing of renewable energy generation sources, among other applications. Accordingly, reducing the cost to operate a kinetic energy storage system is important. In some embodiments, the cost of operating the kinetic energy storage system (and the cost to purchase the system) can be offset by cost savings in energy bills caused by the kinetic energy storage system.

FIG. 1 is a block diagram of an energy storage management system in accordance with an illustrative embodiment. An energy storage management system 100 includes multiple sensors 110, multiple actuators 120, a cache 150, a processor 160, and a communications interface 170. In alternative embodiments, additional, fewer, and/or different elements may be used. For example, in some embodiments, fewer than or greater than three actuators 120 (or sensors 110) may be used.

An example energy storage management system 100 includes a set of modules. The concept of a module is used to represent a system resource. In an illustrative embodiment, a module is a stand-alone piece of software that interacts with one or more pieces of hardware (e.g., a sensor 110). Other system processes use the module to interface with a system resource. Examples of resources in the energy storage management system 100 include sensors 110, actuators 120, etc. In alternative embodiments, any suitable resource may be represented by a module. Sensors 110 can include thermocouples, load cells, seismometers, etc. Actuators 120 can include motors, relays, adjustable power supplies, digital to analog converters, etc.

In an illustrative embodiment, each module has a unique identifier and an associated object file. The object file contains one or more subroutines that can be invoked by other processes. Each subroutine in the object file adheres to an interface that defines the name and the return type of the function. Such a configuration allows the system runtime to properly identify and invoke the correct subroutine when interfacing with the module. The object file also contains subroutines that identify the data type of the module (e.g., binary, floating point number, integer, etc.). In an illustrative embodiment, the data type of the module is used to calculate the amount of memory allocated for caching and for the historian processes.

A value corresponding to each resource within the energy storage management system 100 is acquired by executing resource subroutines contained within the object file associated with its module. The value corresponding to a resource can include a status of the resource (e.g., operating normally, experiencing an error, etc.), a state of the resource (e.g., in setup mode, in calibration mode, etc.), a measurement of the resource (e.g., a temperature, a pressure, a distance, a flow, etc.), or any other suitable property. In an illustrative embodiment, one or more of the resource subroutines each access hardware attached to the energy storage management system 100 and read an output from the corresponding sensor or actuator of the resource. For example, a temperature subroutine can read an output from a temperature sensor 110 of the energy storage management system 100.

In an illustrative embodiment, once a resource subroutine has been invoked, the value of the respective resource is stored in a cache contained within shared memory, such as cache 150. Modules or other subroutines that use the resource value can use the resource value stored in the cache 150. That is, in an illustrative embodiment, rather than executing a resource subroutine for each resource value used by a module, the module can access the value of the resource by reading from the cache 150.

In an illustrative embodiment, a polling process updates the cached value at a user-defined frequency. The polling frequency for each resource (e.g., a sensor 110) can be selected based on the characteristics of the resource. For example, a relatively slow changing temperature may be polled less frequently than a relatively rapidly changing input, such as current of a motor. The frequency of polling can be any suitable frequency, such as once per millisecond, once per second, once per five seconds, etc. Such an updating procedure helps to ensure that the cached value is up-to-date. In an illustrative embodiment, actuator cache 150 values are updated when the output state of the respective resource is changed. In some embodiments, resources (e.g., sensors 110) whose outputs change rapidly are polled more frequently than resources whose outputs do not change rapidly. Processes that read resource data at a rate higher than the polling frequency are not affected because they read from the cache 150, and do not directly interface with the resource.

In some embodiments, the energy storage management system 100 consists of one or more processes that share information with each other using modules. A shared memory cache 150 makes it possible for these processes to communicate with the system and each other. In some embodiments, modules are used to interface with an internal or external resource, such as a sensor 110 or actuator 120. In some embodiments, the modules serve as a general-purpose subroutine which allows the modules to control the respective internal or external resource, such as a sensor 110 or actuator 120.

The energy storage management system 100 includes a communication interface 170 to facilitate communications, such as over a network. The network can include any suitable network such as a local area network (LAN), a wide area network (WAN), metropolitan area network (MAN), the Internet, etc. The communications over the network can include wired communications and/or wireless communications and can include serial and/or parallel communications. In an illustrative client-server arrangement, the energy storage management system 100 utilizes Transmission Control Protocol/Internet Protocol (TCP/IP) to communicate with an outside server to upload diagnostic and historical data to the outside server. The outside server can perform services such as coordinating multiple systems, performing calculations, etc. In an illustrative distributed arrangement, energy storage management system 100 utilizes TCP/IP to communicate and sync information with software nodes of other energy storage management systems 100. Such information can be transmitted using a dedicated process that sends a full or partial system snapshot at a defined interval. Communication can use any suitable protocol, such as those that use TCP/IP. Some example communication protocols include Hypertext Transfer Protocol (HTTP), Secure Shell (SSH), Modbus, Distributed Network Protocol (e.g., DNP3), etc. In an illustrative embodiment, a dedicated process on the receiving node receives the transmitted information and updates corresponding modules.

Figure 2:
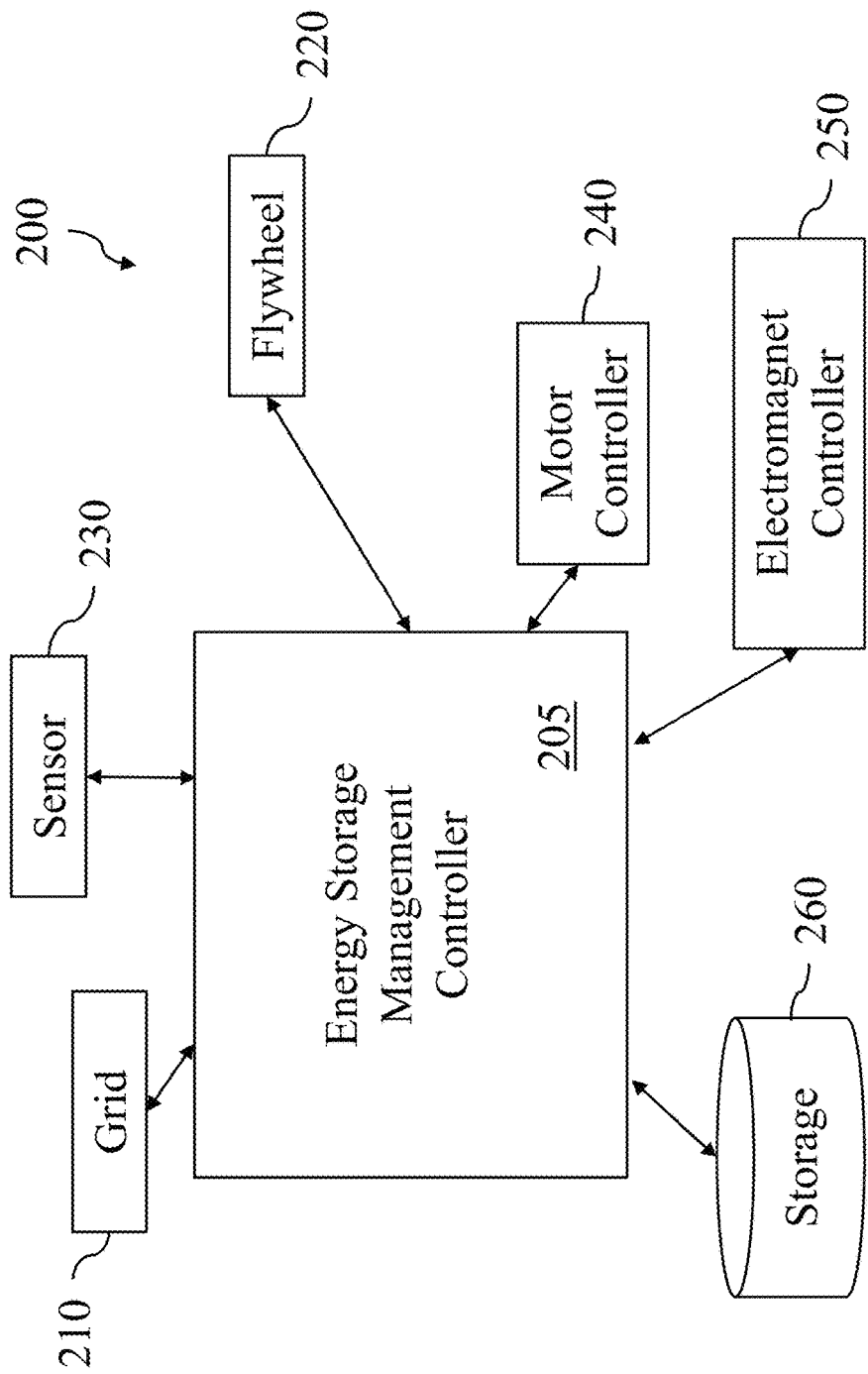
FIG. 2 is a block diagram of an energy storage management system implemented with a flywheel in accordance with an illustrative embodiment.

FIG. 2 is a block diagram of an energy storage management system implemented with a flywheel in accordance with an illustrative embodiment. A system 200 includes an energy storage management controller 205, a grid 210, a flywheel 220 (e.g., a rotor), a sensor 230, a motor controller 240, an electromagnet controller 250, and a storage 260. In alternative embodiments, additional, fewer, and/or different elements may be used. For example, in some embodiments, the system 200 includes multiple sensors 230. In an illustrative embodiment, the storage 260 is an electronic memory storage device.

In an illustrative embodiment, when a system 200 (which can be the same as the energy storage management system 100) is connected to a grid 210 (e.g., an electrical grid), energy is loaded into and unloaded from a flywheel 220 based on desired power requests. That is, electrical energy from the grid 210 can be transferred to (and stored in) the flywheel 220. Similarly, energy stored in the flywheel 220 can be transferred to the grid 210. The energy transferred between the grid 210 and the flywheel 220 is converted (e.g., from electrical to kinetic energy) using any suitable means (e.g., via a motor/generator). The grid 210 can be any suitable power source, such as an electrical grid, a generator, a battery, etc.

In an illustrative embodiment, the charge and discharge of energy of the flywheel 220 is determined by the speed of the flywheel 220, the torque applied to or applied by a motor/generator, and system efficiencies. In alternative embodiments, additional factors can determine the charge and discharge of energy of the flywheel 220. In some embodiments, the energy storage management controller 205 determines whether to charge the flywheel 220 with energy from the grid 210 or to discharge energy to the grid 210 based on an estimated desired torque value. To charge and discharge the flywheel 220 at a desired power level, the energy storage management controller 205 uses efficiency tables to set motor torque. In an illustrative embodiment, the efficiency tables are generated automatically. The energy management storage system 200 charges and discharges the flywheel 220 according to the desired power by setting the torque of the motor at an optimum value (which can be found in a table based on speed of the flywheel 220 and system efficiencies).

In an illustrative embodiment, the energy storage management controller 205 creates a motor efficiency matrix. Motors (and various other components such as bearings, sensors, magnets, etc.) can vary from one another even if the motors are the same brand, model, size, etc. In an illustrative embodiment, the energy storage management controller 205 creates a motor efficiency matrix for the particular system 200 that the energy storage management controller 205 manages.

In an illustrative embodiment, the energy storage management controller 205 creates a motor efficiency matrix that is used to accurately control motor torque, to model the system 200, and for diagnostics. During flywheel 220 operation, energy from the grid 210 is transferred into the flywheel 220 via a motor. That is, a motor is powered by the grid 210 and spins the flywheel 220. During the initial operation of the system 200 (or any other suitable time), the energy storage management controller 205 measures the power output by the motor and the direct current (DC) power of the motor at specific parameters (e.g., speed of the flywheel 220, torque of the motor, etc.) to set the basis of the motor efficiency matrix. In an illustrative embodiment, charging efficiency is calculated using the following equation:

$$ChargingEfficiency = \frac{MotorPower}{DCPower}$$

where $$MotorPower \text{ (kW)} = \frac{\text{Torque}(N \cdot m) \times \text{Speed (RPM)}}{9549}$$

and $$DCPower \text{ (kW)} = \frac{DCVoltage \times DCCurrent}{1000}$$

In an illustrative embodiment, discharging efficiency is calculated using the following equation:

$$DischargingEfficiency = \frac{DCPower}{MotorPower}$$

The efficiency calculations above calculate the motor efficiency but do not include power loss from electronics, etc. In alternative embodiments, efficiency calculations do include power loss from electronics, etc.

In some embodiments, the power input to the motor is alternating current (AC) power. In an illustrative embodiment, current transducing clamps (or any other suitable device, technique, or method) measure AC power input to the motor. In such embodiments, the AC power measurement is used instead of the DC power in the calculations.

In an illustrative embodiment, the energy management controller 205 calculates the efficiency values that are used in creating a motor efficiency matrix. The motor efficiency matrix is a grid of possible power (e.g., in kW) and speed (e.g., in RPM) combinations for the motor and the flywheel 220. The motor efficiency matrix is filled in (at least partially) using the calculated efficiency values. The remaining values can be interpolated using the calculated values. Any suitable interpolation method can be used. In some embodiments, the specific interpolation methods vary based on which matrix values are calculated (e.g., which speeds and power levels are calculated). In an illustrative embodiment, the motor efficiency matrix is used to control the flywheel 220, simulate the flywheel 220 behavior in models, diagnose motor behavior over time, etc. As discussed in greater detail below, a vacuum efficiency matrix can be created in a similar manner.

In some embodiments, the stationary and overall energy loss characteristics of the flywheel 220 are used to calculate performance of the system 200 in various applications, which can minimize energy costs, as discussed in greater detail below. Stationary energy loss characteristics include the energy loss of the system 200 when the flywheel 220 is not rotating. In some instances, using inaccurate or unknown efficiency values in the motor efficiency matrix leads to using the system 200 in a suboptimal manner. Thus, by utilizing accurate efficiency values for the motor (and air friction), optimal flywheel 220 utilization may be achieved. Energy loss of the system 200 can change depending upon various factors, such as flywheel 220 speed. In some instances, the efficiencies of each system 200 are different due to manufacturing and system component inconsistencies. Customization of parameters (e.g., the motor efficiency matrix) for each unique system 200 further optimizes operation when compared to use of pre-determined, standard parameters.

In some embodiments, the system 200 automatically generates air friction vector calculations on an initial test, which is used in optimization algorithms. In some embodiments, the air friction vector is dynamically adjusted according to performance (e.g., real-time calculations). The air friction vector can be monitored over time. If the air friction vector increases over time, the system 200 can determine that there has been a degradation in one or more components (e.g., a vacuum seal surrounding the flywheel 220).

In an illustrative embodiment, the air friction vector is used to model the system 200 over time and diagnose system efficiency performance. Flywheel air friction loss is correlated to $RPM^2$ and the vacuum level surrounding the flywheel 200 (e.g., the air friction vector). In an illustrative embodiment, the system 200 calculates the air friction loss at various speeds. The air friction loss at the various speeds can be used in application simulations and diagnostics, as described in greater detail below. In an illustrative embodiment, air friction loss is measured (or calculated) during system calibration (or any suitable time). In an illustrative embodiment, to calculate air friction data, the flywheel 220 is spun and then allowed to coast for a short amount of time (e.g., 5-10 minutes) at set speeds. Any suitable operating speed may be used as the set speed. In an illustrative embodiment, relatively high speeds are used because the air drag at higher speeds is greater and, therefore, more pronounced. In some embodiments, speeds greater than 3,000 RPM are used. For example, the flywheel 220 is spun up to a speed of 3,000 RPM using the motor and then allowed to coast (e.g., by setting motor torque to zero) for one minute. The system 200 measures the speed of the flywheel 220 over the minute to determine the speed lost per second (e.g., by using linear best fit lines). The speed loss per second (or per minute) can be converted to power (e.g., kW) loss. The calculated power loss is the power lost due (primarily) to air friction.

In some embodiments, the algorithm for determining the air friction loss described above is performed when the system 200 is in a test mode (e.g., not in normal operation). In some instances, the system 200 may not be available to be in test mode. In some embodiments, the system 200 calculates the air friction vector efficiency as the flywheel energy storage system is in use (e.g., during normal operation). In such an embodiment, the system 200 calculates power in an ideal setting and compares the calculated power in an ideal setting to the actual (e.g., measured) power produced or used. The ideal setting can be an ideal system 200 that is 100% efficient. For example, a flywheel 220 is spun up to a starting speed. The motor controller 240 is then set to control the motor at a known power level for a set amount of time, for example one hour. Thus, the motor applies a known amount of power (e.g., in kW) for a known amount of time (e.g., an hour), and the flywheel 220 accelerates over the known amount of time. The amount of energy (e.g., in kWh) input into the flywheel 220 over the known amount of time is computed and compared to the amount of energy stored over the known amount of time. For example, the speed difference of the flywheel 220 from the starting speed to the speed at the end of the known amount of time (e.g., one hour) can be used to determine the amount of energy stored in the flywheel 220. The difference between the amount of energy input into the flywheel 220 and the amount of energy actually stored by the flywheel 220 can be used to estimate efficiency loss. The amount of energy actually stored in the flywheel 220 can be determined by measuring the speed of the flywheel 220. The energy loss can be determined at various speeds using such a technique. A quadratic interpolation algorithm can be used to create a best fit vector for each speed. The vectors can be used in diagnostics, vacuum system design, application simulations, etc.

In some instances, accessing the motor efficiency matrix alone may not result in accurate torque values that match desired power ratings. In an illustrative embodiment, the system 200 continuously sends the correct torque values to the motor to match desired power ratings. In an illustrative embodiment, the amount of power applied to the flywheel 220 is set by a user. In an illustrative embodiment, a positive desired power level indicates charging of the flywheel 220 with energy and a negative desired power level indicates discharging of the flywheel 220. In response to receiving the desired power level, the system 200 charges/discharges at the desired power level. To implement the desired power level, a motor torque is calculated based on the speed of the flywheel 220, desired power level, and the motor efficiency (e.g., at the desired power level and flywheel 220 speed). In an illustrative embodiment, for charging the flywheel 220 with energy, torque is calculated using the following equation:

$$\text{Torque} = \frac{DesiredPower \text{ (kW)} \times 9549 \times MotorChargingEfficiency}{\text{Speed (RPM)}}$$

In an illustrative embodiment, for discharging energy from the flywheel 220, torque is calculated using the following equation:

$$\text{Torque} = \frac{DesiredPower \text{ (kW)} \times 9549}{MotorDischargedEfficiency \times \text{Speed (RPM)}}$$

To maintain an accurate amount of power input into the flywheel 220, the amount of torque to be applied by the motor is calculated (e.g., continuously or at regular intervals) as the speed of the flywheel 220 changes.

In some instances, one or more components of the system 200 vibrate at varying levels based on the rotation speed of the flywheel 220 and system geometry. The system geometry can include the shape of the flywheel 220, the shape of the housing, etc. Higher vibrations occur at system resonances. In certain conditions, vibrations at the resonances can make the system mechanically unstable. In some instances, vibrations at the resonance frequencies can be ignored. In other instances, damping components can be added to the system 200 to reduce the overall vibrations. However, the damping components can be inefficient and/or create inefficiencies in the system.

In an illustrative embodiment, the energy storage management controller 205 dynamically calculates the vibration magnitude at various speeds. The vibration magnitudes can be used to control the system 200 and to characterize the overall system 200. In an illustrative embodiment, the amount of vibration is quantified using one or more acceleration sensors 230, such as an accelerometer or seismometer. The acceleration sensors 230 can be placed at various locations around the system 200. In some embodiments, the signals received from the acceleration sensors 230 are each sent through noise filters and digitizers. The digitizers compute a Fast Fourier Transform (FFT) of the signals and output the magnitude and frequency of the vibration sensed by the acceleration sensors 230. Such calculations can be performed continuously throughout the lifetime of the system 200 (or during any suitable time). The calculated magnitude and frequencies can be stored in a historian (e.g., storage 260) along with data from other sensors. In some embodiments, the energy storage management controller 205 creates a vibration magnitude spectrum based on motor and/or flywheel 220 speed. The FFT frequency spectrum can be used to create a unique vibration signature for each system 200.

In some embodiments, the vibration spectrum is determined during initial testing of the system 200. In such embodiments, the spectrum properties can change over the lifetime of the system 200. For example, the motor's rotor may become loose over time, the flywheel 220 may warp, components can be replaced with new components, etc. Such changes can change the vibration characteristics of the system 200. In some embodiments, the changes can be detected and accounted for, thereby helping to ensure safe and efficient operation of the system 200. In an illustrative embodiment, the energy storage management controller 205 dynamically compares the frequency spectrum of a full cycle to the last computed vibration spectrum (e.g., the vibration spectrum determined during initial testing). A full cycle can include ramping the flywheel 220 up to speed and ramping the flywheel 220 down (e.g., charging and discharging the flywheel 220). In some instances, if the new spectrum is different from the programmed spectrum, and the new spectrum is confirmed over one or more additional cycles, and the system 200 uses the new spectrum in place of the previously determined spectrum.

In an illustrative embodiment, each system 200 has a unique vibration spectrum according to its own geometry and performance. The vibration signature varies from system 200 to system 200, and the profile of each system 200 may change over time. In an illustrative embodiment, each system 200 can detect faults and provide diagnostic information by comparing the vibration spectrum of the respective system 200 to a standard vibration spectrum. In some embodiments, the standard vibration spectrum is pre-determined and stored at the system 200. In alternative embodiments, multiple systems 200 determine their respective vibration spectrums and transmit the vibration spectrums to a central server. In some embodiments, each system 200 automatically transmits the determined vibration spectrum at regular intervals. The central server can accumulate the vibration spectrums from the multiple systems 200 and determine an average vibration spectrum. The central server can transmit the average vibration spectrum to each of the systems 200. The average vibration spectrum can be compared to the individual vibration spectrums of the various systems 200 to determine whether any of the systems 200 have vibration spectrum components that are significantly different than the average vibration spectrum. A vibration spectrum component that is significantly different (e.g., greater than 10%) than the average vibration spectrum may be indicative of a problem. In some instances, the system 200 is adjusted or changed (e.g., the speed of the flywheel 220 is limited) in response to determining that a vibration component of the system 200 is significantly different than the average vibration spectrum.

In some instances, the efficiency of a motor can change over time. Thus, although an initial motor efficiency matrix calculation may be accurate at the time of the calculation, the actual efficiencies of the motor may change over time and the motor efficiency matrix may become inaccurate. In some embodiments, the energy storage management controller 205 can monitor the efficiencies of the motor over time and update the motor efficiency matrix accordingly, thereby leading to optimal energy storage performance and reducing the risk of failure. For example, it may be desired to supply the grid 210 (e.g., a small grid) with a certain power level from the system 200. The grid 210 is able to compensate for a supplied power difference of, for example, 0.1 kW. If the motor efficiency curve of the system 200 changes over time, the system 200 may output a difference of 1.0 kW from the desired power level. In such an example, the grid 210 is unable to compensate for the 1.0 kW difference supplied to the grid 210, which may cause problems (e.g., the grid 210 may become chaotic). Thus, in some embodiments, the motor efficiency matrix is updated over time to reflect actual motor efficiencies. Updating the motor efficiency matrix can occur passively and/or actively.

In an illustrative embodiment, the system 200 actively tests the performance characteristics of the motor at certain torque and speed values. In some instances, the torque and speed values at which the active tests are performed are determined based on identified gaps and inaccuracies in the efficiency matrix to fill in the gaps and/or correct inaccuracies. In an illustrative embodiment, inaccuracies are determined by comparing input electrical power used to charge the flywheel 220 with energy to output mechanical power supplied to the flywheel 220 at the same speed. Efficiency in the table should be equal to the ratio of output power to input power. If the efficiency in the table differs from such a ratio, the efficiency table may have inaccuracies.

In some embodiments, active tests are not performed during normal operation. In some instances, an efficiency matrix (e.g., a new or updated motor efficiency matrix) is compared to a standard efficiency matrix. If significant differences exist between the calculated efficiency matrix and the standard efficiency matrix, a determination is made as to whether the calculated (e.g., the new or updated) efficiency matrix should be used. In some instances, the determination is made remotely from the system 200 (e.g., by a remote server or by a remote technician).

In some embodiments, the energy storage management controller 205 compares a recently measured (or calculated) motor efficiency value with one or more previously measured (or calculated) motor efficiency values at (or near) a speed and torque value. If the recently measured value is significantly different than (e.g., greater than a threshold value from) the one or more previously measured values, it is determined that the motor efficiency has changed over time. In response to such a determination, the energy storage management controller 205 can updated the motor efficiency matrix.

The system 200 has the ability to passively test the performance characteristics at the speed and torque values encountered during normal operation. The passive tests may be performed without interference of normal operation of the system 200. In some embodiments, efficiency values are continuously (or periodically) calculated and checked against a standard model (or one or more previously calculated values). In some instances, calculated values that are significantly different from the standard model are transmitted to a central server. The central server can compare the calculated values with calculated values of other systems 200.

In some embodiments, the system 200 includes a motor control subsystem 240. The motor control subsystem 240 can control the amount of torque that the motor applies to the flywheel 220 (or that the flywheel 220 applies to the motor). The motor control subsystem 240 can limit the rate at which torque is changed to prevent damage to mechanical and/or electrical components of the system. Some examples of mechanical damage include spline damage (e.g., damage in the connection between the flywheel 220 and the motor), vibrational resonance issues, and axial displacement of the flywheel 220. Examples of possible electrical damage include transient voltages and/or currents that can damage electronics. In some embodiments, desired motor torque is transmitted to the motor control subsystem 240. The motor control subsystem 240 can transition the amount of motor torque from the current amount of torque to the desired amount of motor torque at a rate less than a predetermined threshold value.

In some embodiments, the motor control subsystem 240 has one or more constraints that the motor control subsystem 240 abides by. Examples of such constraints include a rate of change of motor torque, the maximum amount of torque supported by the motor, the maximum amount of torque that can be applied without overheating the motor or inverter, the maximum amount of torque that can be applied without causing the motor to stall at low speeds, a maximum amount of power applied to the motor or the flywheel 220, a maximum amount of motor current, maximum input or output current of the system 200 to the grid 210, the maximum amount of current through inverters, etc. In some instances, constraints change dynamically depending on characteristics of the motor at certain speeds, environmental factors such as ambient temperature, etc. In some embodiments, the motor control subsystem 240 receives a desired power value that the motor is to provide to the flywheel 220 (or that the flywheel 220 is to provide to the motor). The motor control subsystem 240 determines the amount of motor torque to provide based on the speed of the flywheel 220 and the motor efficiency matrix. The motor control subsystem 240 causes motor torque to be the determined motor torque, thereby transferring the desired power level between the flywheel 220 and the grid 210.

In an illustrative embodiment, the system 200 includes an electromagnetic control 250. As mentioned above, the flywheel 220 can be suspended using electromagnetism, thereby reducing the amount of friction the flywheel 220 has on bearings and increasing the efficiency of the system 200. The electromagnet controller 250 controls the amount of current supplied to an electromagnet that lifts the flywheel 220. By controlling the amount of current through the electromagnet, the electromagnet controller 250 controls the amount of lift that the electromagnet applies to the flywheel 220.

While decreasing the amount of force exerted on the bottom bearings by the flywheel 220 increases efficiency by reducing friction, high amounts of force on the top bearings increases friction, thereby increasing friction and reducing efficiency. High amounts of force on either the top or bottom bearings may result in excessive heat and reduced life of the bearings. In an illustrative embodiment, the amount of force applied to the top bearings and the bottom bearings are measured with sensors 230, such as load cells. The energy storage management controller 205 can use the readings from the sensors 230 to determine the amount of lifting force on the flywheel 220 that minimizes the load on both the top and bottom bearings. In an illustrative embodiment, the electromagnet is positioned above the flywheel 220 such that higher current through the electromagnet produces an upward force on the flywheel 220, thereby increasing the amount of weight applied to the top bearings and reducing the amount of weight applied to the bottom bearings. Lower current causes the flywheel 220 to drop, thereby increasing the amount of force applied to the bottom bearings and reducing the force applied to the top bearings.

Figure 3A:
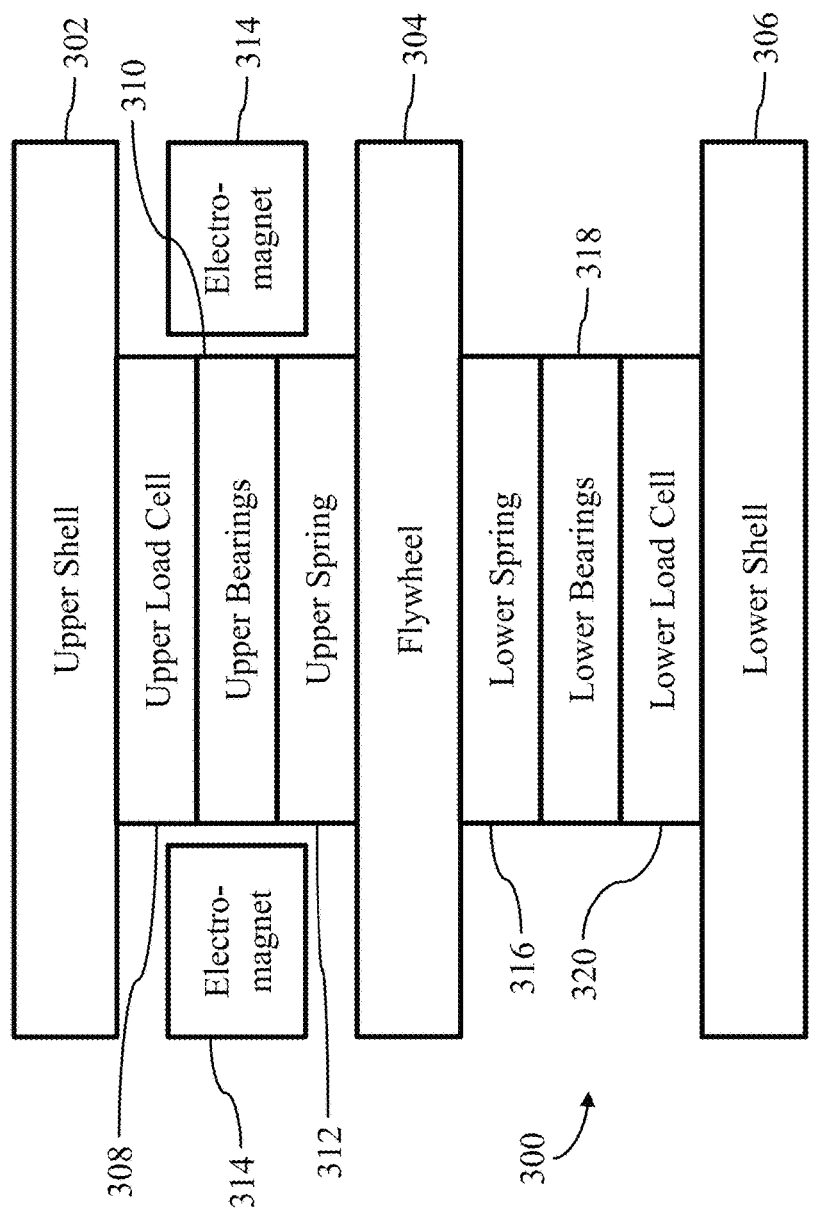
FIG. 3A is a block diagram of a flywheel system in accordance with an illustrative embodiment.

FIG. 3A is a block diagram of a flywheel system in accordance with an illustrative embodiment. FIG. 3A shows a cross-sectional diagram of the flywheel system 300. The flywheel system 300 has an upper shell 302, a flywheel 304, a lower shell 306, an upper load cell 308, upper bearings 310, an upper spring 312, an electromagnet 314, a lower spring 316, lower bearings 318, and a lower load cell 320. In alternative embodiments, additional, fewer, and/or different elements may be used.

The upper shell 302 is separated from the flywheel 304 by the upper load cell 308, upper bearings 310, and an upper spring 312, which can be a wave spring. The electromagnet 314 is between the upper shell 302 and the flywheel 304. In an illustrative embodiment, the electromagnet 214 has an annular shape. The lower shell 306 is separated from flywheel 304 by a lower spring 316, lower bearings 318, and a lower load cell 320. In an illustrative embodiment, the upper spring 312 and the lower spring 316 are mechanical springs in contact with the flywheel 304 with the upper face and lower face of the flywheel 304. The upper spring 312 and the lower spring 316 dampen upward and downward movements of the flywheel 304.

The upper spring 312 and the lower spring 316 abut the upper bearings 310 and lower bearings 318, respectively. In an illustrative embodiment, the upper bearings 310 and lower bearings 318 include metal balls that help reduce friction in the movement of the flywheel 304. The upper load cell 308 and the lower load cell 320 measure the amount of force applied to the respective load cell. For example, the upper load cell 308 measures the force applied between the upper shell 302 and the upper bearings 310 (e.g., the amount of force applied to the upper shell 302 by the flywheel 304). The electromagnet 314 creates a magnetic force that lifts the flywheel 304, thereby removing some of the weight of the flywheel 304 from the lower springs 316. By lifting the flywheel 304, force is added to the upper spring 312. In an illustrative embodiment, the electromagnet 314 is adjusted based on the weight and lateral movement of the flywheel 304. For example, if the flywheel 304 has lateral movement above a threshold value, the electromagnet 314 can be adjusted (e.g., increased current) to reduced the lateral movement.

Using the electromagnet 314 to lift the flywheel 304 helps to reduce wear of upper bearings 310 and lower bearings 318. In an illustrative embodiment, the energy storage management controller 205 controls (via the electromagnet controller 250) the flywheel system 300 such that the flywheel 304 exerts maximum or minimum weight (or force) on the upper wave spring 312 and the lower wave spring 316. For example, the electromagnet 314 is controlled such that the flywheel 304 exerts at least 200 pounds (lb) on the upper wave spring 312 and at least 800 lb on the lower wave spring 316. Any suitable thresholds can be used for the electromagnetic forces applied to the flywheel 304. In some embodiments, electrical current of the electromagnet 314 is adjusted based on FFT calculations to adjust the weight on the upper and lower load cells during times of high vibrations to lower the amount of vibration.

Figure 3B:
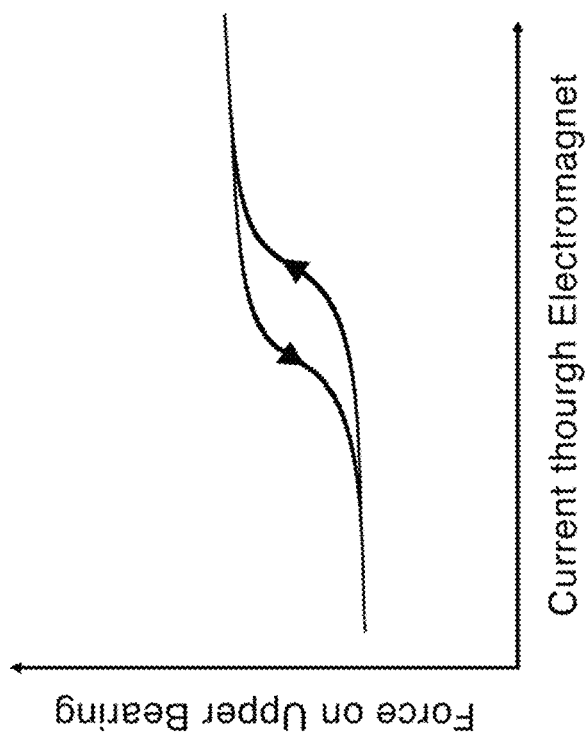
FIG. 3B is a graph of magnetic hysteresis present in an energy storage management system in accordance with an illustrative embodiment.

FIG. 3B is a graph of magnetic hysteresis present in an energy storage management system in accordance with an illustrative embodiment. In an illustrative embodiment, the energy storage management controller 205 accounts for hysteresis present in the flywheel system 300. Hysteresis is caused by a change in flywheel 304 displacement that occurs when the amount of force being applied by the electromagnet exceeds the weight of the flywheel 304, thereby causing the flywheel 304 to "jump." Alternatively, when the amount of force being applied to the flywheel falls below a certain value, the flywheel can "drop." These two states have very different characteristics, with the latter being generally more stable.

The vibrational resonance of the motor can also impact the flywheel 304 displacement (e.g., vertical location). Vibrations introduced into the flywheel system 300 by the motor can cause the flywheel to drop, resulting in a sudden increase in the amount of force being applied to the lower bearings 318. The sudden increase in force applied to the lower bearings 318 can result in a spike in temperature of the lower bearings 318. In an illustrative embodiment, the energy storage management controller can compensate for increased vibrations caused by the motor resonance by increasing the amount of current applied to the electromagnet 314 during times of high resonance. The magnitude of the resonance can be measured using a seismometer (or any other suitable device). The output from the seismometer is processed using an FFT. When there is a high magnitude of resonance (as determined by analyzing the FFT), the energy storage management controller can respond by increasing the amount of current supplied to the electromagnet 314 (and increasing the lifting force of the electromagnet 314), thereby preventing the flywheel 304 from dropping.

Figure 3C:
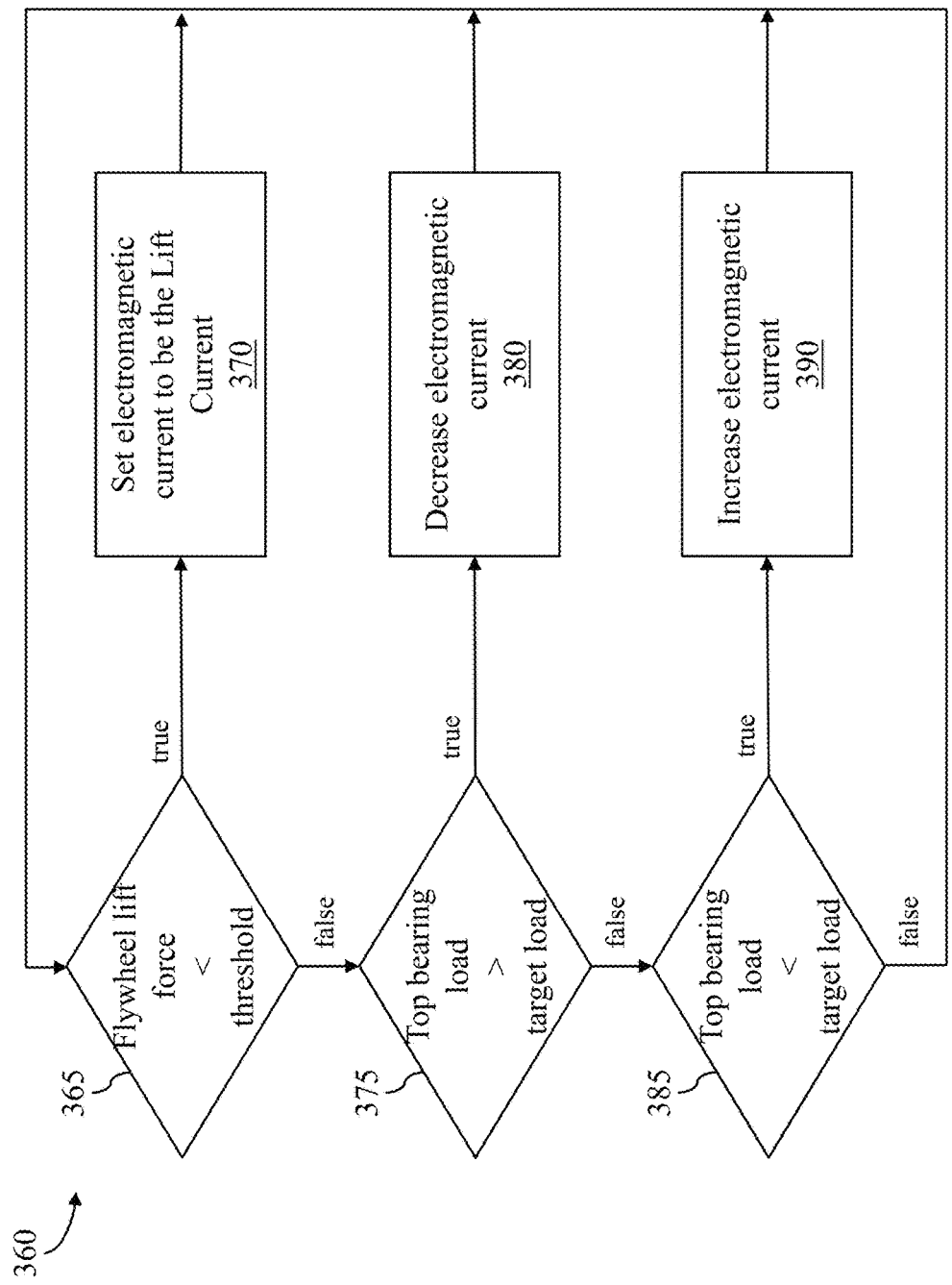
FIG. 3C is a flow diagram of a method of adjusting the lifting force of an electromagnet in accordance with an illustrative embodiment.

FIG. 3C is a flow diagram of a method 360 of adjusting the lifting force of an electromagnet in accordance with an illustrative embodiment. In alternative embodiments, additional, fewer, and/or different operations may be performed. Also, the use of a flow diagram and/or arrows is not meant to be limiting with respect to the order or flow of operations. In an illustrative embodiment, method 360 is performed by the energy storage management system 205. In an alternative embodiment, method 360 is performed by the electromagnetic controller 250.

In operation 365, the upward force applied to the flywheel is compared to a threshold value (e.g., a threshold force). In an illustrative embodiment, operation 365 includes determining if the motor has dropped. In an illustrative embodiment, if the amount of upward force applied to the flywheel is below the threshold value, in operation 370, the current passing through the electromagnet is set to be a Lift Current value. The Lift Current value can be a value (e.g., an amount of electrical current) that lifts the flywheel and increased the amount of force applied to the upper bearings. In an illustrative embodiment, the Lift Current is a predetermined value. In an alternative embodiment, the Lift Current can be changed (e.g., increased) as long as the upward force applied to the flywheel is below the threshold value.

If the upward force applied to the flywheel is greater than or equal to the threshold value, then, in operation 375, the top bearing load is compared to a target load. The top bearing load is the force measured by the upper load cell 308. The target load can be a target amount of force measured by the upper load cell 308. The target load can be predetermined based on the type of flywheel, the weight of the flywheel, the type of bearings, etc. If the top bearing load exceeds the target load, then, in operation 380, the amount of current passing through the electromagnet 314 is decreased. In an illustrative embodiment, the amount of current is decreased by a predetermined amount.

If the top bearing load does not exceed the target load, then, in operation 385, the top bearing load is compared to the target load. If the top bearing load is less than the target load, then, in operation 390, the amount of current passing through the electromagnet 314 is increased. In an illustrative embodiment, the current is increased by a predetermined amount. In an illustrative embodiment, operation 365 is performed after operation 370, operation 380, operation 390, and operation 385. In alternative embodiments, a proportional-integral derivative (PID) loop (or similar) is used to control the force of the electromagnet 314.

In some instances, keeping an ongoing record of the state of the system 200 is a valuable tool for diagnostics and research. In an illustrative embodiment, the system 200 has a historian. The historian can be used for storing a snapshot of modules. The snapshots can be taken periodically and can be stored, for example, in storage 260. In an illustrative embodiment, the storage 260 is a persistent type of storage. For example, each snapshot includes the cached value of modules. In an illustrative embodiment, only modules that have been marked for historian support in metadata of the respective module are included in snapshots. In some instances, historical values are useful for performing diagnostics, calculating cost savings, performing research, etc. Historical values can provide a lifetime of metrics for each unique system. In an illustrative embodiment, historical values are stored on a remote disk.

In some embodiments, to optimize CPU usage (e.g., usage of processor 160), historical values are indexed by time. Indexing by time does not have a performance cost (or has a small performance cost) because time moves in an ascending direction. In an illustrative embodiment, new entries for the value of a module are appended to the end of a file. The new entries can include a timestamp. In an illustrative embodiment, searches based on time are fast because the appropriate timestamp can be found using algorithms such as binary search.

In an illustrative embodiment, each snapshot is stored in a buffer and is transferred to a permanent disk at a set interval. Such a method can minimize disk usage. Querying recent data (which, in some instances, is the most common type of query) is efficient because the recent data can be read from memory (e.g., the buffer) rather than a disk (which can take longer than reading data from a memory). In an illustrative embodiment, the archive architecture includes a set of files distributed across a directory tree. Each file can be associated with a length of time. For example, each file can include data from a second, a minute, an hour, a day, etc. Such an architecture uses relatively small archive files, which increases efficiency of the system. Such an architecture also allows access to multiple files in parallel. In an illustrative embodiment, the path of each file is constructed using the timestamp of the snapshot. Thus, finding a piece of data is relatively quick because the file patch can be easily reconstructed using the timestamp of the desired piece of data. In an illustrative embodiment, by using timestamps in the file pathway, the file system does not need to be traversed to find a piece of data. In an illustrative embodiment, the historical files are compressed. For example, the files can be compressed based on a determination that the amount of disk resources available is below a threshold amount. In some instances, compression is highly effective for this type of data because much of the stored data can be redundant and/or repeated. Any suitable method of compression can be used.

Figure 4:
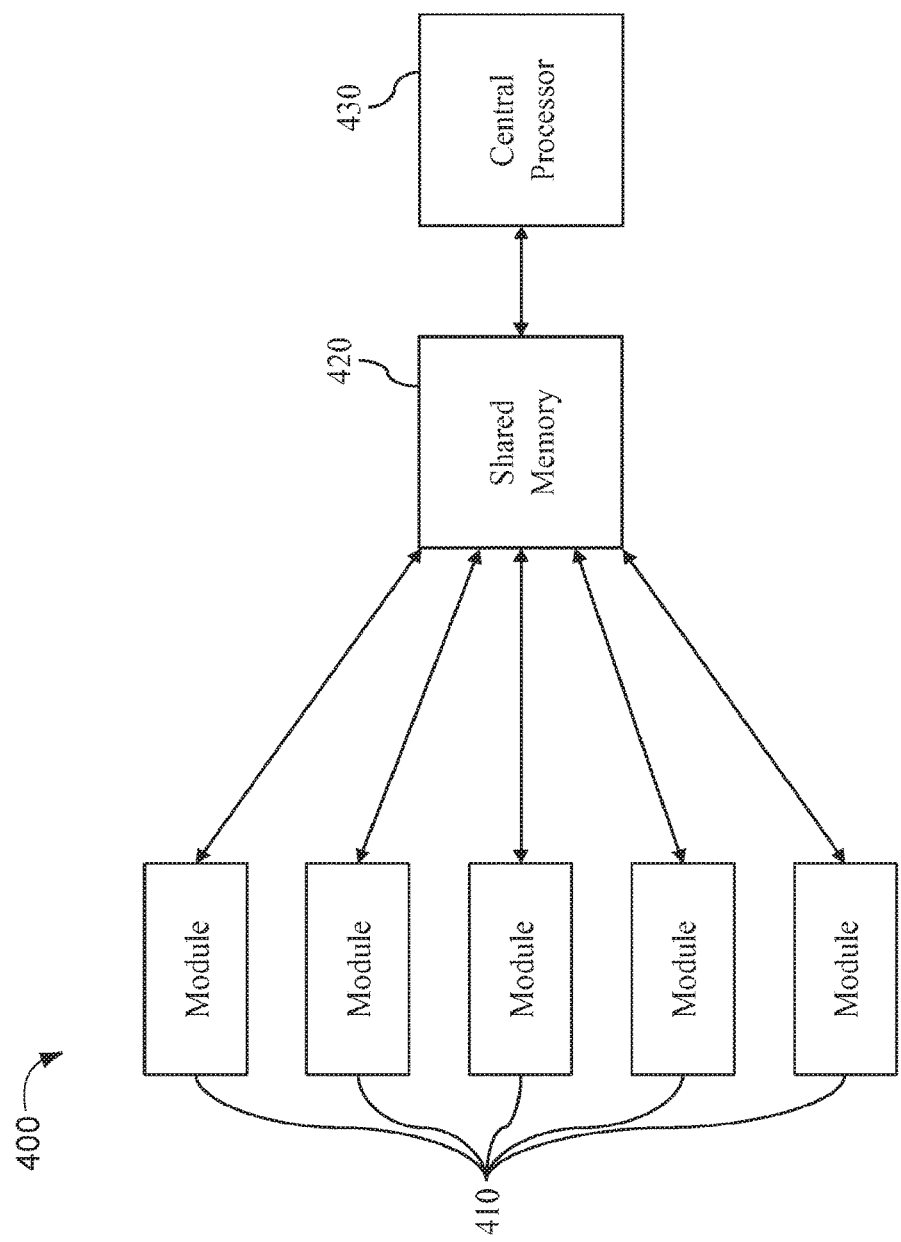
FIG. 4 is a block diagram of a hot-swappable module arrangement in accordance with an illustrative embodiment.

FIG. 4 is a block diagram of a hot-swappable module arrangement in accordance with an illustrative embodiment. An illustrative system 400 includes multiple modules 410, a shared memory 420, and a central processor 430. In alternative embodiments, additional, fewer, and/or different elements may be used.

In an illustrative embodiment, each of the modules 410 is in communication with the shared memory 420. One or more of the modules 410 can include or be in communication with a sensor (e.g., a sensor 110). In an illustrative embodiment, each module 410 is a piece of code. In an alternative embodiment, each module 410 can include a processor and a memory storage device. In some embodiments, one or more of the modules 410 are associated with an output device. In some embodiments, a module 410 can be associated with an input device (e.g., a sensor) and can be associated with an output device. Each of the modules 410 communicates with the shared memory 420 to update the status of the sensors and/or output devices. For example, a module 410 with a sensor can communicate to the shared memory the status (e.g., current reading) of the sensor. In another example, a module 410 with an output device can read from the shared memory 420 the status of the output that the output device should have (e.g., an amount of output electrical current).

In an illustrative embodiment, the central processor 430 (e.g., processor 160) runs one or more processes that use information provided by the modules 410. For example, the central processor 430 can adjust output settings (e.g., outputs of a module 410) based on an input (e.g., temperature) received from a module 410. The central processor 430 communicates with the shared memory 420 to receive values stored in the shared memory 420 by the modules 410. In embodiments in which one or more of the modules 410 are associated with output devices, the central processor 430 can transmit output values to the shared memory 420, which are read by the respective modules 410. Thus, the central processor 430 and the modules 410 communicate data with each other by reading and writing the data to the shared memory 420.

In some embodiments, if a module 410 is disconnected (either physically or communicatively) from the shared memory 420, the shared memory 420 does not over-write the last received data from the disconnected module 410. For example, a module 410 is in communication with a thermometer and the module 410 transmits a temperature reading to the shared memory 420 once per second. The central processor 430 controls a valve based on the temperature reading. The central processor 430 receives the temperature reading by reading a memory slot in the shared memory 420 corresponding to the module 410. The central processor 430 reads the temperature reading once per second. If the module 410 is disconnected from the shared memory 420, the module 410 does not transmit updated temperature readings to the shared memory 420 for the central processor 430 to read. Rather, when the central processor 430 attempts to read the temperature reading from the shared memory 420, the central processor 430 reads the last temperature reading that the shared memory 420 successfully received from the module 410. When the module 410 is back in communication with the shared memory 420, the temperature reading can be updated in the shared memory 420 and, thus, the central processor 430 can read the updated temperature reading. In such an example, although the module 410 was not communicating with the shared memory 420, the central processor 430 functioned normally, but did not receive updated temperature readings. Rather, the central processor 430 received the last successfully transmitted temperature reading.

Thus, in some embodiments, the modules 410 can be hot-swappable. That is, one or more of the modules 410 can be removed, altered, and placed back into commission without stopping the central processor 430. In some embodiments, each module 410 includes programming. Thus, in an illustrative embodiment, while the central processor 430 is operating, a module 410 can be removed from the system 400, have the programming of the module 410 changed or modified, and re-commissioned into the system 400 without stopping the central processor 430.

Using hot-swappable modules provides several benefits. While performing research and testing of the system 200, a user can have access to all of the system information while the system is running. Real-time access allows the system 200 users to make adjustments to the control configurations and software by viewing real-time information and using the information as feedback. This capability is provided through a user interface. The system 200 can display both historical and real-time plots that can be used to view and compare the values of different modules 410 over time. In many situations, the ability to modify system software is desirable during normal system operation via a process of module 410 hot swapping. This is especially true in systems like a flywheel where routine testing can take several hours.

Figure 5:
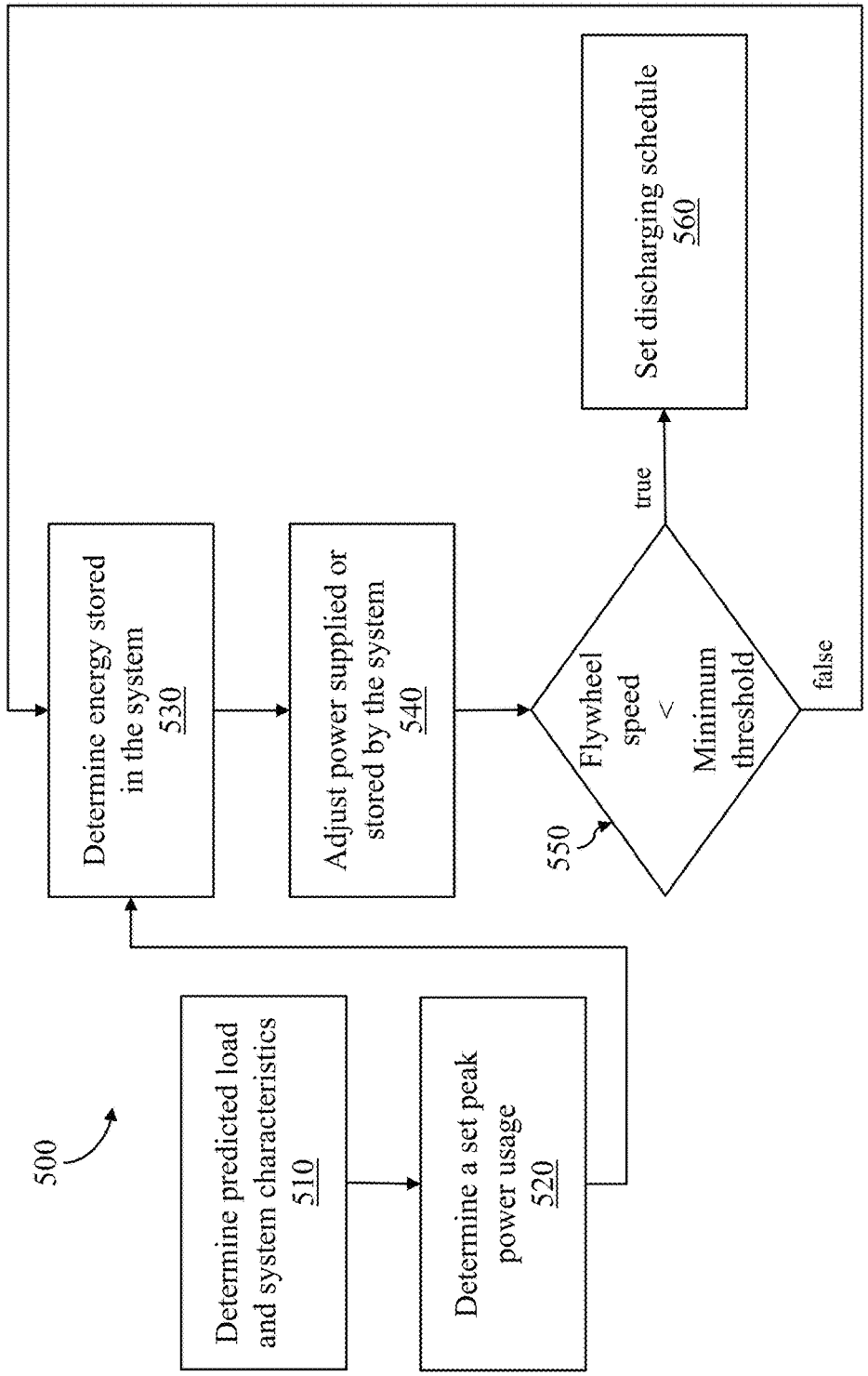
FIG. 5 is a flow chart of a method for reducing the peak power consumption in accordance with an illustrative embodiment.

FIG. 5 is a flow chart of a method 500 for reducing the peak power consumption in accordance with an illustrative embodiment. In alternative embodiments, additional, fewer, and/or different elements may be used. Also, the use of a flow chart and/or arrows is not meant to be limiting with respect to the order or flow of operations. In some embodiments, the system 200 can be used to reduce the peak power consumed from the grid 210. For example, the system 200 can be used on the electrical customer side of an electrical meter. During peak power consumption by the customer's site, the system 200 can provide power to the customer's electrical equipment, thereby reducing the amount of power received by the grid 210 during peak power consumption. During non-peak power consumption from the grid 210, the system 200 can store electrical energy. Using method 500, an electrical customer can spread out power used from the grid 210 over a period of time, such as a day. In some instances, power consumed from the grid 210 is more expensive during peak consumption hours than power consumed during non-peak consumption hours. Thus, in some embodiments, method 500 can reduce the electrical power bill.

In operation 510, the predicted load and system characteristics can be determined. In some embodiments, the predicted load can be input by a user. For example, the user can estimate the predicted load and transmit the predicted load to the system 200 using a user input. The predicted load can be the predicted amount of energy consumed by a customer site for an amount of time, such as one day. In some instances, the predicted load can be determined by system 200 by estimating the predicted amount of energy consumed by the customer site based on the energy consumed during previous days. System characteristics can include efficiencies of the system 200 and the total amount of energy that can be stored by the system 200.

In operation 520, the set peak power usage can be determined. The set peak power usage can be a setpoint of the maximum amount of power received from the grid 210. For example, the predicted load is the amount of power consumed by a customer site during a day. The amount of power can fluctuate during a day. Based on the system characteristics, the set peak power usage can be determined (e.g., estimated) by predicting the amount of power that can be supplied by the system 200 during peak power consumption and the amount of power that can be stored during non-peak power consumption.

In operation 530, the energy stored in the system 200 is determined. The energy stored in the system 200 can be determined based on the speed of the flywheel 220 and the system efficiencies. In operation 540, the power supplied or stored by the system 200 is adjusted. For example, the power consumed by the customer's site can be compared to the set peak power usage. If the power consumed by the customer's site is greater than the peak power usage, the system 200 can be adjusted to provide power to the customer's site, thereby reducing the amount of power consumed from the grid 210. The amount of power provided by the system 200 can be the difference between the amount of power used by the customer's site and the set peak power usage. If the power consumed by the customer's site is less than the set peak power usage, then the system 200 can be configured to store energy from the grid 210. For example, the amount of power received by the system 200 can be the difference between the set peak power usage and the power consumed by the customer's site. The amount of power received by the system 200 can be less than a maximum amount of power that can be received by the system 200 without damaging the system 200.

In operation 550, the speed of the flywheel 220 is compared to the minimum threshold speed of the flywheel 220. If the speed of the flywheel 220 is below the minimum threshold speed, then in operation 560, a discharging schedule can be set. For example, the system 200 can be set to discharge the remaining amount of energy stored in the flywheel 220 over a specified amount of time. In an illustrative embodiment, when the power consumed by the customer's site is below the peak power usage and the flywheel 220 is completely discharged, a startup process can be implemented to spin the flywheel 220 up, thereby storing energy in the flywheel 220. If the speed of the flywheel 220 is greater than (or equal to) the minimum threshold speed, the method 500 can return to operation 530. In some embodiments, method 500 can be restarted once per day. In alternative embodiments, method 500 is performed at any suitable time, such as once per hour, once per week, once per season, etc.

In some instances, the utility company that provides power through the grid 210 determines the cost of energy based on the absolute peak power consumed by the customer's site, for example, in a day. Thus, the cost of energy can be determined based on the maximum amount of power consumed at any point during a day. In instances in which peak power consumption is determined based on the absolute peak power consumed, method 500 can be used to reduce the absolute peak power consumed.

In some instances, the utility company determines the cost of energy based on the average peak load over a time interval. For example, the utility company can determine the amount of energy consumed during a specified time interval. In some instances, the specified time interval can be an hour. For example, the utility company can determine the amount of energy consumed from 1 pm to 2 pm, from 2 pm to 3 pm, from 4 pm to 5 pm, etc. In some instances, the utility company can determine the amount of energy consumed during any suitable amount of time, such as between 12 pm to 4 pm. In some instances, the utility company can determine the peak energy consumed during 15-minute increments.

In embodiments in which the utility company determines average peak load over a time interval, the method 500 can be modified to maximize the amount of energy supplied by the system 200 during the time interval. For example, in some embodiments, the system 200 provides power most efficiently when the system 200 discharges at a maximum rate. Thus, instead of supplying a constant amount of power over the time interval, the system 200 can be configured to provide a maximum amount of power (or the most efficient amount of power) during a first portion of the time interval, and not provide power during the remaining portion of the time interval. For example, to reduce the peak power consumed by the customer's site by one third of the capacity of the system 200 over fifteen minutes, the system 200 can be configured to provide maximum power during five minutes, and not provide power during the remaining fifteen minutes.

In some instances, discharging the energy storage system 200 at its maximum rate for a relatively short amount of time can create large aggregate power changes on the local utility if there are multiple energy storage systems 200 that use the same (or a similar) algorithm. For example, if the utility calculates peak demand on fifteen minute intervals, there may be large aggregate load changes every fifteen minutes. The large aggregate load changes can cause the grid 210 to become chaotic. In some instances, if the power swing is too great, the grid 210 may fail and cause blackouts. To prevent such effects, the specific times that the maximally efficient charge/discharge schedule can be based on pseudorandom numbers is a way to protect the utility from major aggregate power swings. In alternative embodiments, random numbers may be used. For example, the charge/discharge schedule can be set randomly within the 15 minutes. In some instances, the system 200 can communicate with adjacent systems 200 using the same or similar schedules so that the grid experiences a reduction in peak load at the aggregate level. Each energy storage system 200 using the algorithm reduces the local site's peak demand while reducing the overall power of the grid 210 on an aggregate level.

In an illustrative embodiment, a reduction in utility charges is implemented by shifting a customer's load from peak times with high energy costs to off-peak times with lower energy costs. An illustrative algorithm charges the energy storage system 200 at the start of off-peak times and discharges the energy storage system 200 at the start of peak times. In some instances, such an arrangement maximizes air drag loss and may inadvertently create a new building peak demand at off-peak times. Thus, the customer's utility bill may ultimately be increased. In an illustrative embodiment, the energy storage system 200 incorporates efficiency values and energy storage characteristics to reduce the amount of energy consumed by the energy storage system 200. An algorithm charges the flywheel 220 at night (e.g., when energy costs are low) and discharges during the day (e.g., when energy costs are high). For example, the energy storage system 200 can be charged at the end of the off-peak time (while still in the off-peak time) and can discharge during the peak time. Local utility rates provide constant rates for each month. In an illustrative embodiment, the energy storage system 200 shifts the load using utility rates and storage characteristics to charge and discharge at optimal times.

Figure 6:
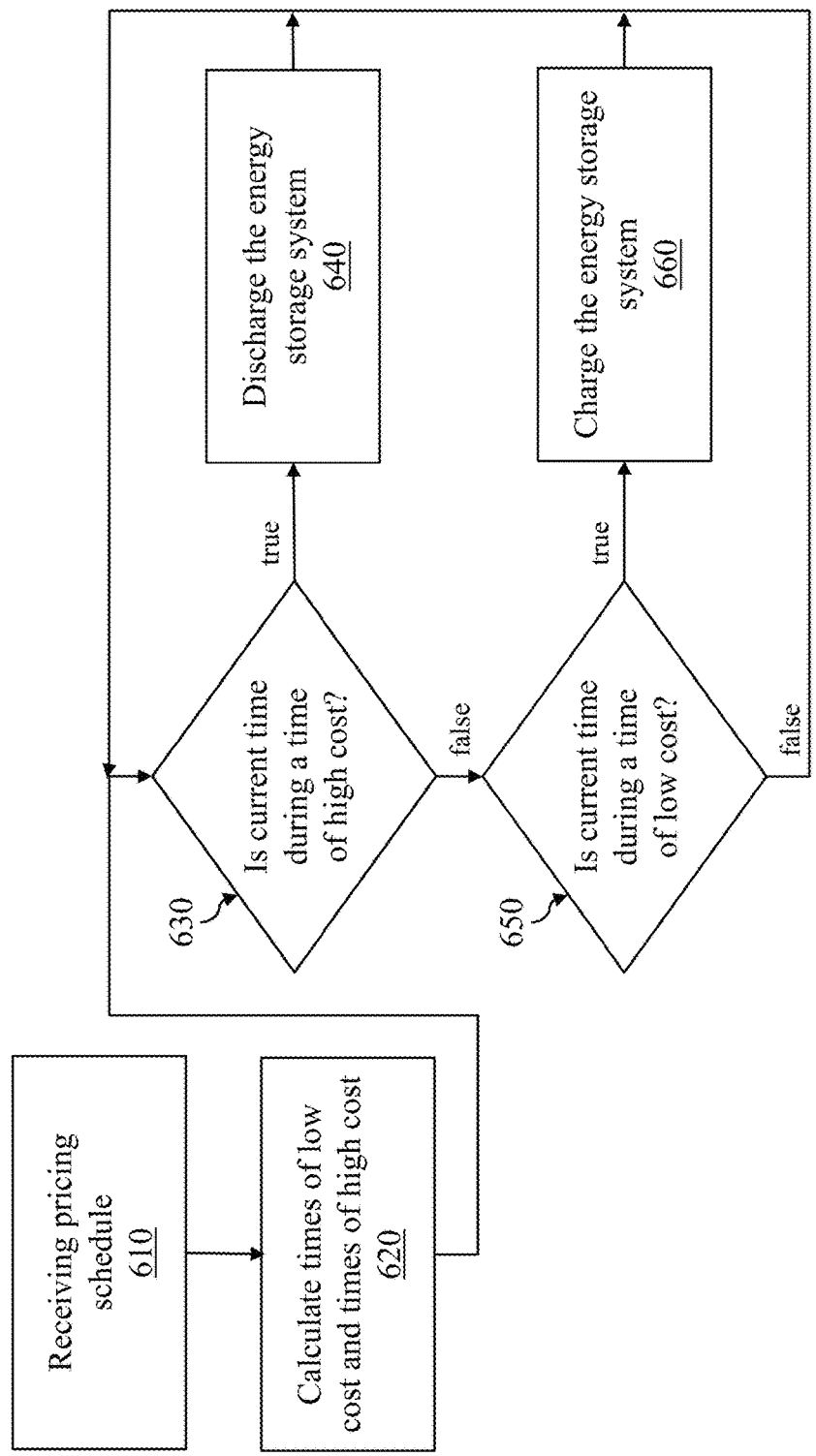
FIG. 6 is a flow diagram of a method to reduce utility bills in accordance with an illustrative embodiment.

FIG. 6 is a flow diagram of a method to reduce utility bills in accordance with an illustrative embodiment. In alternative embodiments, additional, fewer, and/or different elements may be used. Also, the use of a flow chart and/or arrows is not meant to be limiting with respect to the order or flow of operations. In operation 610, a utility pricing schedule is received. The utility pricing schedule can indicate the cost of power received from the grid 210 at different times during the day. In alternative embodiments, any suitable pricing schedule can be used. In operation 620, times of low cost and times of high cost are determined. For example, based on the pricing schedule, the energy storage system 200 can determine times of the day during which power received from the grid 210 is the lowest and times of the day during which power received from the grid 210 is the highest. In an illustrative embodiment, operation 620 includes determining the time of the day that the amount of energy required to charge the energy storage system 200 is the lowest and the time of the day that the amount of energy discharged by the energy storage system 200 is the highest.

In operation 630, the current time is compared to the calculated time of high cost. If the current time is during the calculated time of high cost, in operation 640, energy stored in the energy storage system 200 is discharged (e.g., by decreasing the speed of the flywheel 220). In an illustrative embodiment, the energy storage system 200 is discharged at a constant rate over the time of high cost. For example, the total energy that the energy storage system 200 can provide is divided by the length of the time of high cost to determine the power output of the energy storage system 200. In an illustrative embodiment, the total energy that the energy storage system 200 can provide is determined based on a maximum speed of the flywheel 220 and a minimum operating speed of the flywheel 220.

In operation 650, the current time is compared to the calculated time of low cost. If the current time is during the calculated time of low cost, in operation 640, the energy storage system 200 is charged with energy (e.g., by increasing the speed of the flywheel 220). In an illustrative embodiment, the energy storage system 200 is charged at a constant rate over the time of low cost. For example, total energy that the energy storage system 200 consumes to store the maximum amount of energy (e.g., taking into consideration efficiencies of the energy storage system 200) is divided by the length of the time of low cost to determine the power to be consumed by the energy storage system 200.

In an illustrative embodiment, the energy storage system 200 is configured to display utility cost savings and usage metrics to a user. The energy storage system 200 can display information to a user using a user interface. In an illustrative embodiment, various metrics are calculated dynamically. For example, utility rates can vary based on location, tariffs, tariff adjustments, etc. In some instances, calculating energy cost savings from an energy storage system is estimated based on the reduction in peak demand and the shifting of the load to different times of the day. In an illustrative embodiment, using local utility tariffs, the energy storage system 200 estimates savings from generation and storage and compares the savings to a system without generation or storage capabilities. The amount of savings can include time-of-use rates and reduced peak demand. In an illustrative embodiment, savings are continually updated throughout the month, and each month's savings are stored. Savings can be updated when the utility tariff changes. In alternative embodiments, any suitable method for determining energy cost savings can be used.

In an illustrative embodiment, carbon emission reduction is determined based on energy generation (e.g., from renewable resources) and constant carbon conversion numbers. Any suitable constant carbon conversion numbers can be used. In some instances, determining carbon emission reduction can become relatively complicated when calculating carbon reduction from an energy storage system 200 and variable utility generation profiles. The variable utility generation profile can indicate how the utility generates grid power and the carbon emissions from the energy generation at various times.

In an illustrative embodiment, the energy storage system 200 accurately estimates carbon emission reduction based on energy generation and utilization of the energy storage system 200. For example, a month's carbon emission reduction can be estimated and stored, for example, in a historian. The utility generation profile is dynamically adjusted based on available carbon emission data. The carbon emission data can be provided by the utility company. In an illustrative embodiment, carbon emission values are provided to a carbon emission marketplace and are used for carbon emission trading. A user can trade carbon credits as a way to profit from reducing carbon by using the energy storage system 200 and, for example, a centralized server. Carbon emission saving values can be uploaded to a centralized server and compared with other users' emission profiles. Such a comparison enables users to easily monetize their carbon credits over a centralized marketplace hosted on the centralized server.

In some embodiments, remote login to a centralized server can be difficult because the location of an energy storage system 200 may have restricted access to the Internet. For example, many Internet Service Providers (ISPs) will not guarantee that an IP address that is assigned (e.g., to an energy storage system 200) will stay the same (e.g., be a static IP address). In some instances, an ISP will guarantee a static IP address if the user pays an additional fee.

Many existing firewalls are configured to disable incoming connection requests on all ports by default. There are usually very few exceptions to such a firewall configuration. Such exceptions usually apply only to the most commonly used protocols, such as Hypertext Transfer Protocol (HTTP). In embodiments in which an energy storage system 200 is installed for a user with an existing firewall, reconfiguring the firewall to fix such issues for each customer can be time consuming. Additionally, many routers hide the IP addresses of their internal LAN to outside networks. Each IP address is combined together into a single address, and the router handles the mapping of messages. Such a protocol can prevent network connection requests to originate outside of the internal LAN.

In some instances, deployment of an energy storage system 200 uses an existing corporate LAN to access the Internet. Such networks usually have several layers of firewalls and many restrictive network policies that make remote login to the energy storage system 200 (e.g., by a centralized server) difficult. In an illustrative embodiment, maintaining an encrypted TCP connection between the energy storage system 200 to an outside server (with a static IP) bypasses such restrictions and adds an additional layer of security because a publically accessible IP address is not needed. For example, the centralized server listens for incoming connections from multiple energy storage systems 200. When a connection is made, the centralized server adds the energy storage system 200 with which the connection was made to a connection pool relaying requests from service technicians to the appropriate system in the pool. In the event of a network outage, the energy storage system 200 can attempt to reconnect to the centralized server at a pre-defined interval (e.g., 1 minute).

In an illustrative embodiment, the energy storage system 200 includes a web server that can serve web pages to clients over a network using HTTP. The web pages can show real-time status information of the energy storage system 200 using graphical elements called widgets. The user can view and/or change the state of system modules (e.g., modules 410) using the widgets. The widgets can be used as a quick way to indicate the overall status of the energy management system 200.

An illustrative user interface contains a customizable set of dashboards, such as dashboard 700. Each dashboard can display real-time system information using one or more interactive widgets. A widget is a collection of HTML, JavaScript™, and/or Cascading Style Sheets (CSS) code that can be embedded on an HTML page. The widgets can be used to display the status of different components of the energy storage system 200. In an illustrative embodiment, widgets are interactive and respond to user input. In some embodiments, the widgets utilize the concept of skeuomorphism, which can make the interface more familiar to users. Widgets can mimic an object in the physical world (e.g., a dial, a button, a lever, a slide, etc.). Some examples of skeuomorphism include gauges that appear similar to an analog dial that displays a value within a bounded range. For example, a capacity indicator appears similar to a battery indicator for a laptop or phone and displays values as a percentage of a max capacity. In another example, a switch appears similar to a light switch that displays a binary status (e.g., enabled or disabled) of the switch and allows the user to adjust the state of the switch. In another example, control sliders appear similar to an analog volume slider that displays the status of the slider (e.g., the current value associated with the slider) and allows the user to adjust the value of the slider within a bounded range.

In an illustrative embodiment, each widget is associated with one or more system modules 410, displaying its current state. The current value of the module can be updated dynamically without reloading the web page. The updates can be accompanied with a widget animation to make the transitions in value smooth. In an illustrative embodiment, the widget can also accept user input (e.g., if the module 410 represents a controllable element like an actuator). The use of such a widget allows the user to change the state of an actuator directly from the dashboard.

In an illustrative embodiment, the system uses metadata to determine which type of widget to render on the web page. In some embodiments, multiple types of widgets can be used for the same module 410. By modifying metadata, the user can change the type of widget that corresponds with a sensor or an actuator associated with a module 410. The widget type can be modified by the user using the web interface. Thus, each user can have their own custom dashboard. Widgets for modules 410 associated with sensors can display the status of the sensor. Widgets for modules 410 associated with actuators can be inputs and/or outputs. For example, a widget for a module 410 associated with an actuator can display the status of the actuator and can receive an input from a user to adjust the status of the actuator (e.g., change a valve from closed to open).

In an illustrative embodiment, a widget's appearance can change to indicate to the user that a module value is outside of an acceptable threshold range. The thresholds can be defined in the module's metadata. For example, gauges can change from a neutral color (e.g., blue, green, etc.) to a color that indicates a warning or error (e.g., red, yellow, orange, etc.). In another example, capacity indicators can change from green to red when they are depleted. Text widgets can change the background color or text when the value associated with the module 410 falls outside of the designated range.

In an illustrative embodiment, dashboards can provide an audible feedback to the user if one or more values fall into an undesirable state. The audible feedback can catch the attention of a user during system operation. Such alerts can also be disabled under certain conditions. For example, alerts can be turned off when the system is idle or disabled.

In an illustrative embodiment, a dashboard displays plots and/or charts that correspond with historical data. The charts can show live or historical data. The range and resolution of the charts can be adjusted through the user interface or through metadata. Multiple clients can view the same dashboard at the same time. Such a feature can have little performance impact on the underlying control systems because the value is read from the system cache (e.g., cache 150) and the underlying module 410 code is not invoked.

Figure 7:
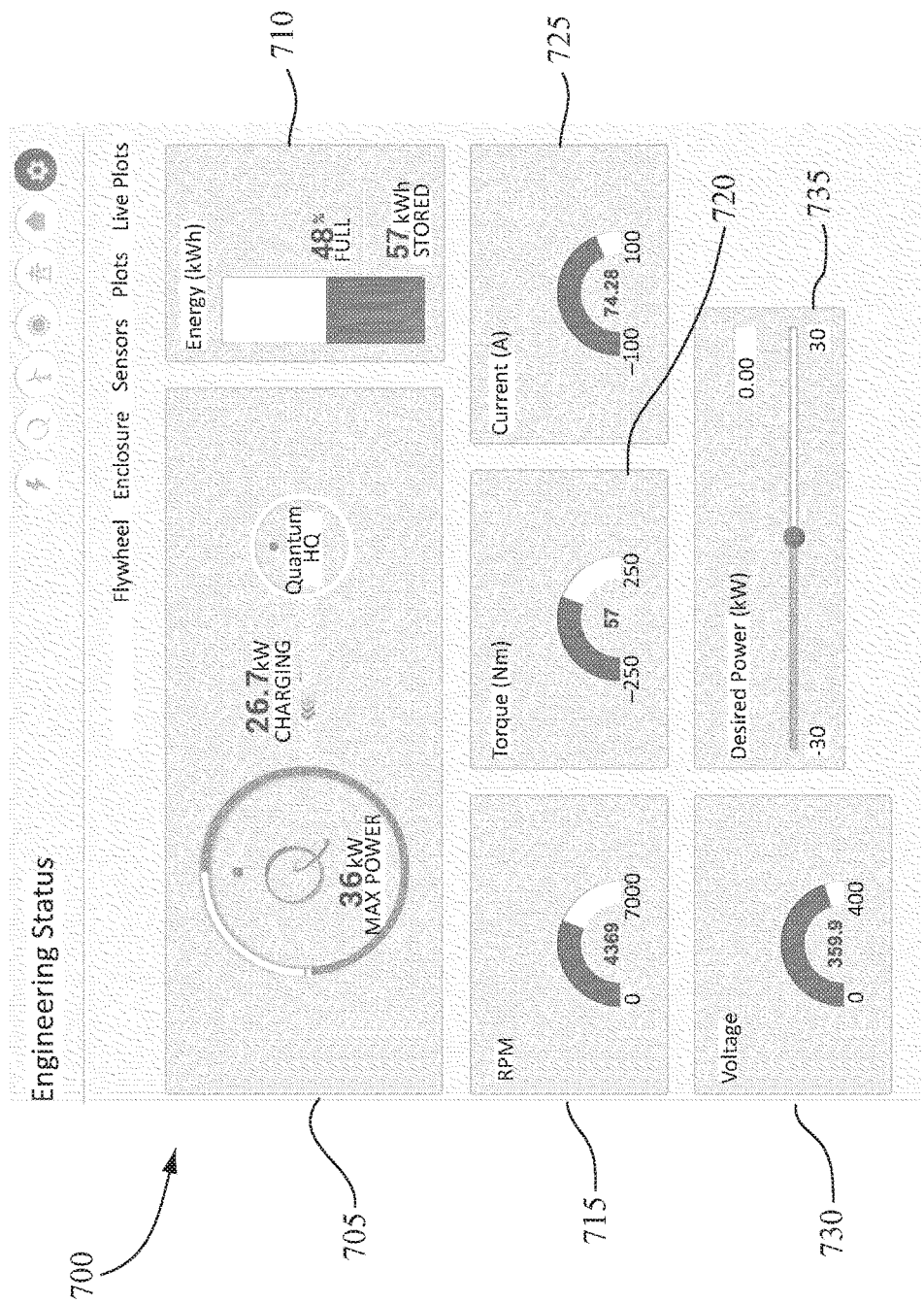
FIG. 7 is an illustration of a graphical user interface dashboard for control and monitoring a flywheel system in accordance with an illustrative embodiment.

FIG. 7 is an illustration of a graphical user interface dashboard for control and monitoring a flywheel system in accordance with an illustrative embodiment. In alternative embodiments, additional, fewer, and/or different elements may be used. An illustrative dashboard 700 includes widget 705, widget 710, widget 715, widget 720, widget 725, widget 730, and widget 735. Widget 705 displays the maximum amount of power that can be supplied by an energy storage system 200 and the amount of power currently supplied or the amount of power currently used to charge the energy storage system 200. Widget 710 displays the amount of energy stored in a flywheel 220 as a percentage of total possible energy stored in the flywheel 220. Widget 715 displays the current speed of the flywheel 220 and the percentage of maximum speed of the flywheel 220. Widget 720 displays the current torque of the motor and the percentage of maximum torque. Widget 725 displays the amount of current of the motor and a percentage of the total amount of current. Widget 730 displays the amount of voltage of the motor and a percentage of the total amount of voltage. Widget 735 displays the current desired power supplied or stored in the flywheel 220 and includes a slider that allows a user to set the desired power of the flywheel 220.

Figure 8:
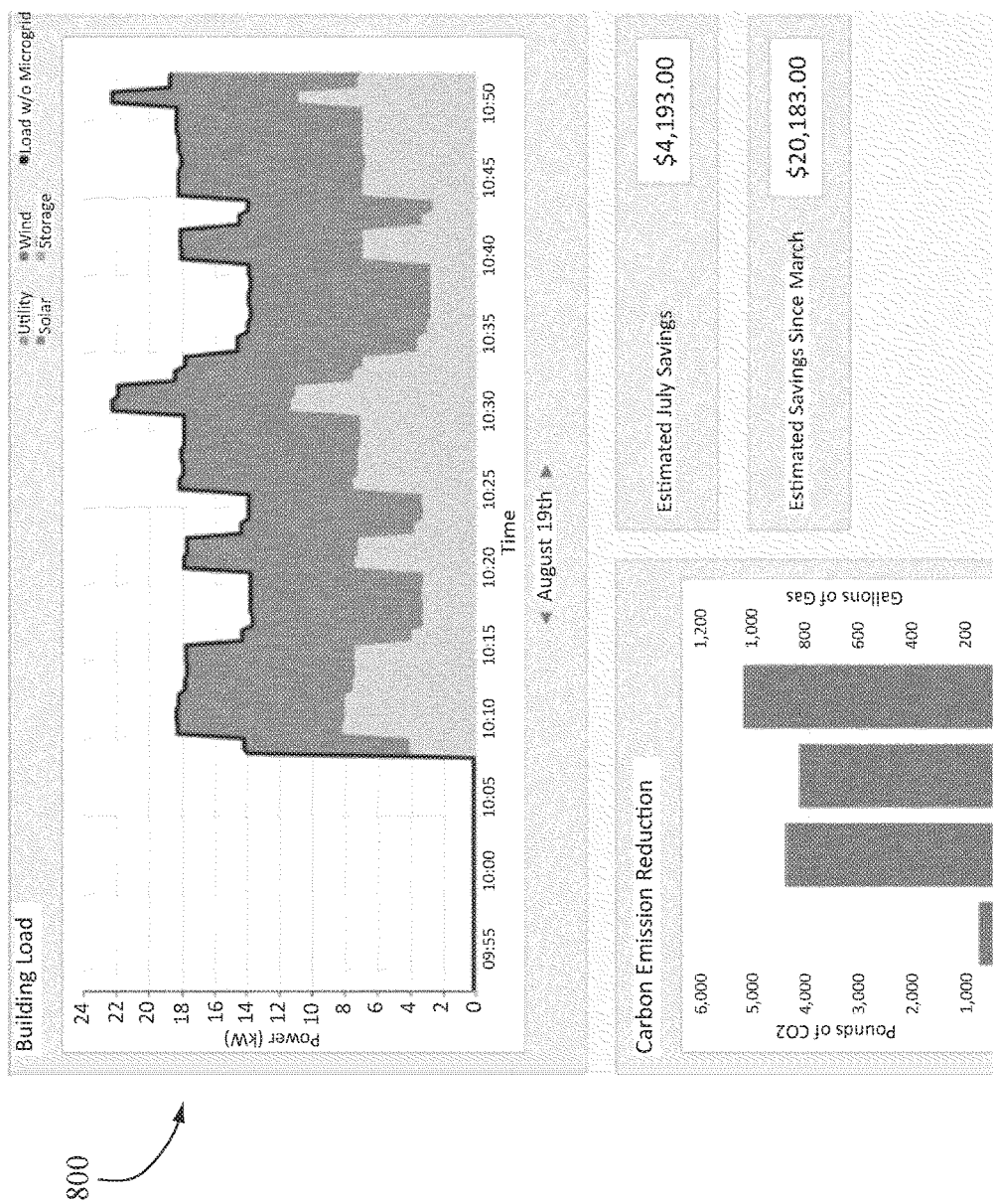
FIG. 8 is an illustration of a graphical user interface for a graph of a building load, carbon emission reduction charts, and estimated savings in accordance with an illustrative embodiment.

In an illustrative embodiment, each user can have their own custom interface associated with their login credentials. FIG. 8 is an illustration of a graphical user interface for a graph of a building load, carbon emission reduction charts, and estimated savings in accordance with an illustrative embodiment. An illustrative dashboard 800 shows a building load graph including energy elements, carbon emission reduction charts, and estimated savings. In alternative embodiments, additional, fewer, and/or different elements may be used.

Figure 9:
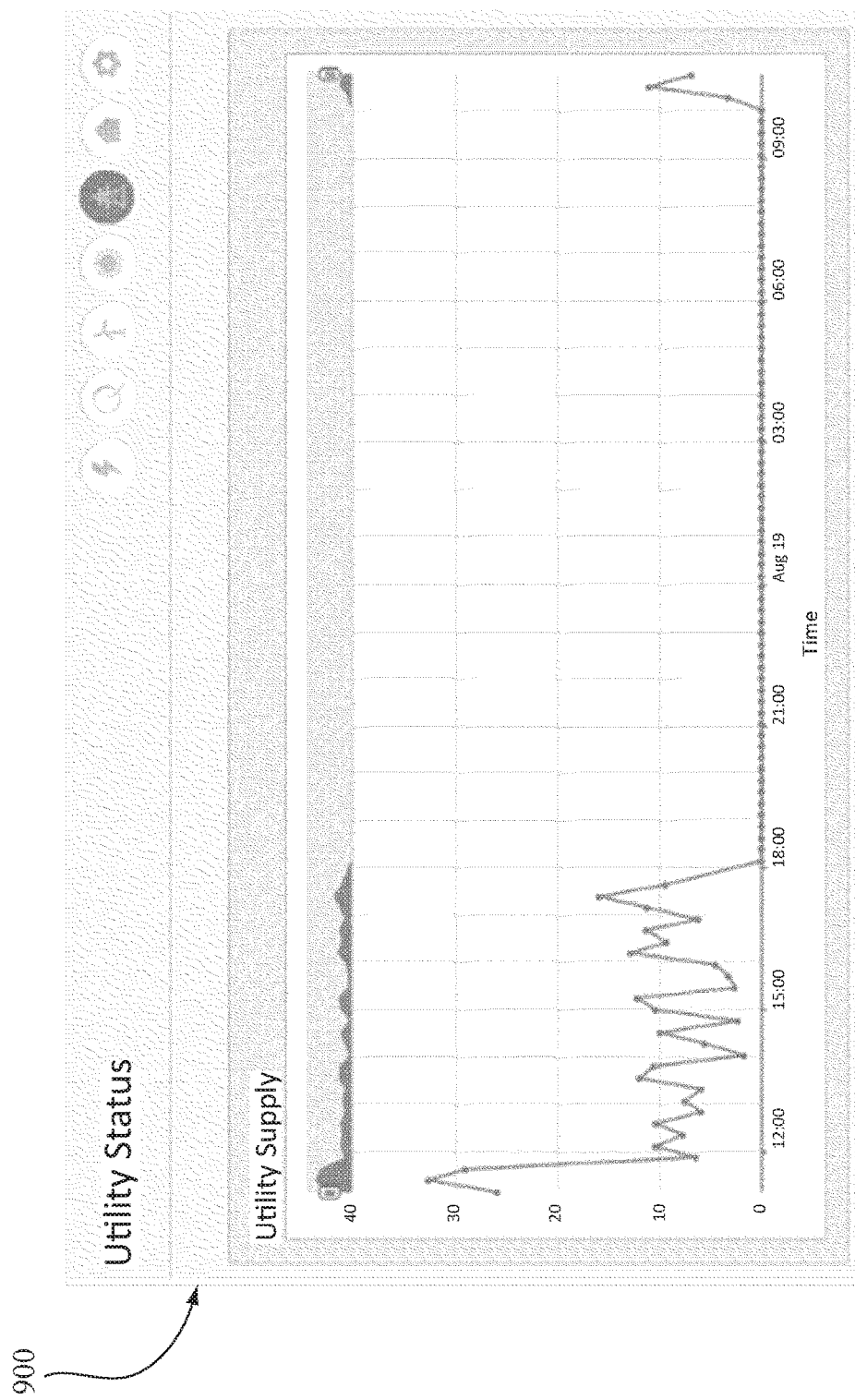
FIG. 9 is an illustration of a graphical user interface for a graph of energy used from a utility supply over time in accordance with an illustrative embodiment.

FIG. 9 is an illustration of a graphical user interface for a graph of energy used from a utility supply over time in accordance with an illustrative embodiment. An illustrative dashboard 900 shows a graph of energy used from a utility over a period of time. In alternative embodiments, additional, fewer, and/or different elements may be used.

Figure 10:
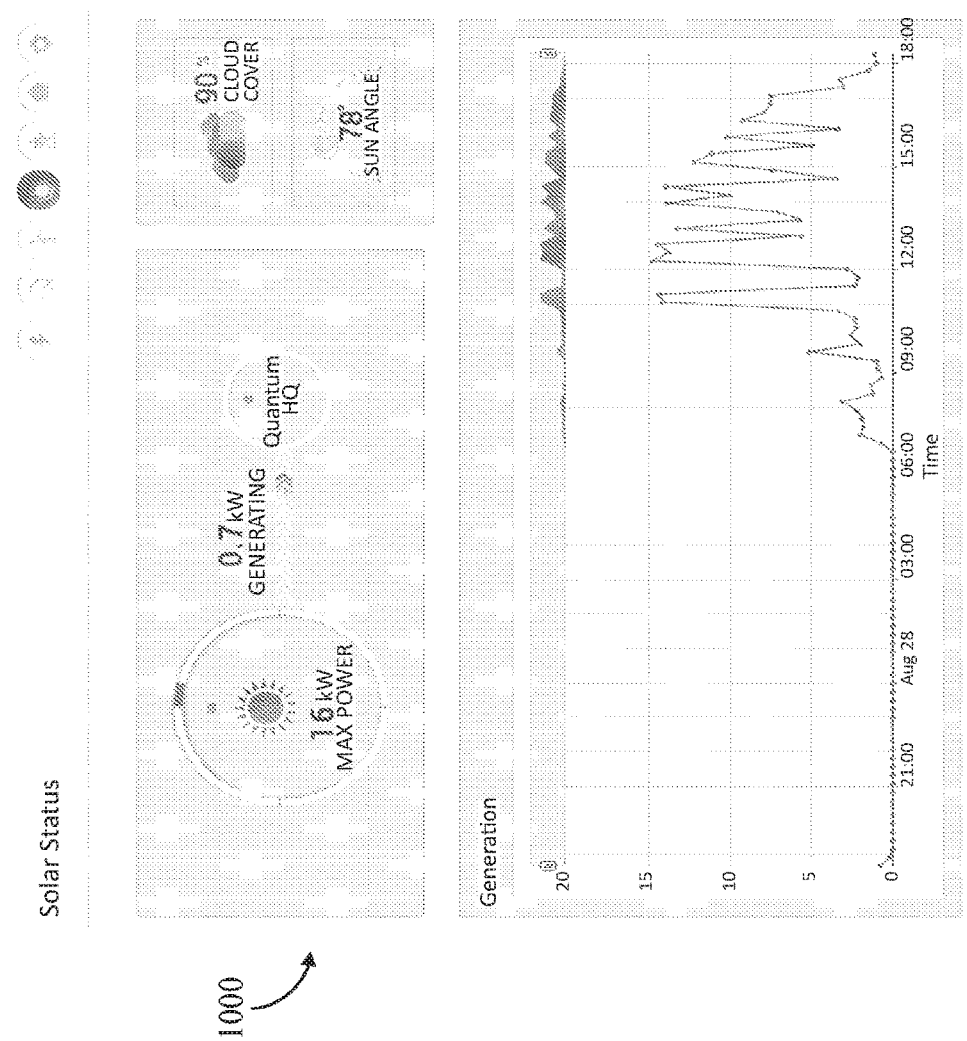
FIG. 10 is an illustration of a graphical user interface for a graph of generated solar energy over time, real-time cloud coverage percentage, and real-time sun angle in accordance with an illustrative embodiment.

FIG. 10 is an illustration of a graphical user interface for a graph of generated solar energy over time, real-time cloud coverage percentage, and real-time sun angle in accordance with an illustrative embodiment. An illustrative dashboard 1000 shows a graph of energy being provided by solar over time, real-time cloud coverage percentage, and real-time sun angle. In alternative embodiments, additional, fewer, and/or different elements may be used.

Figure 11:
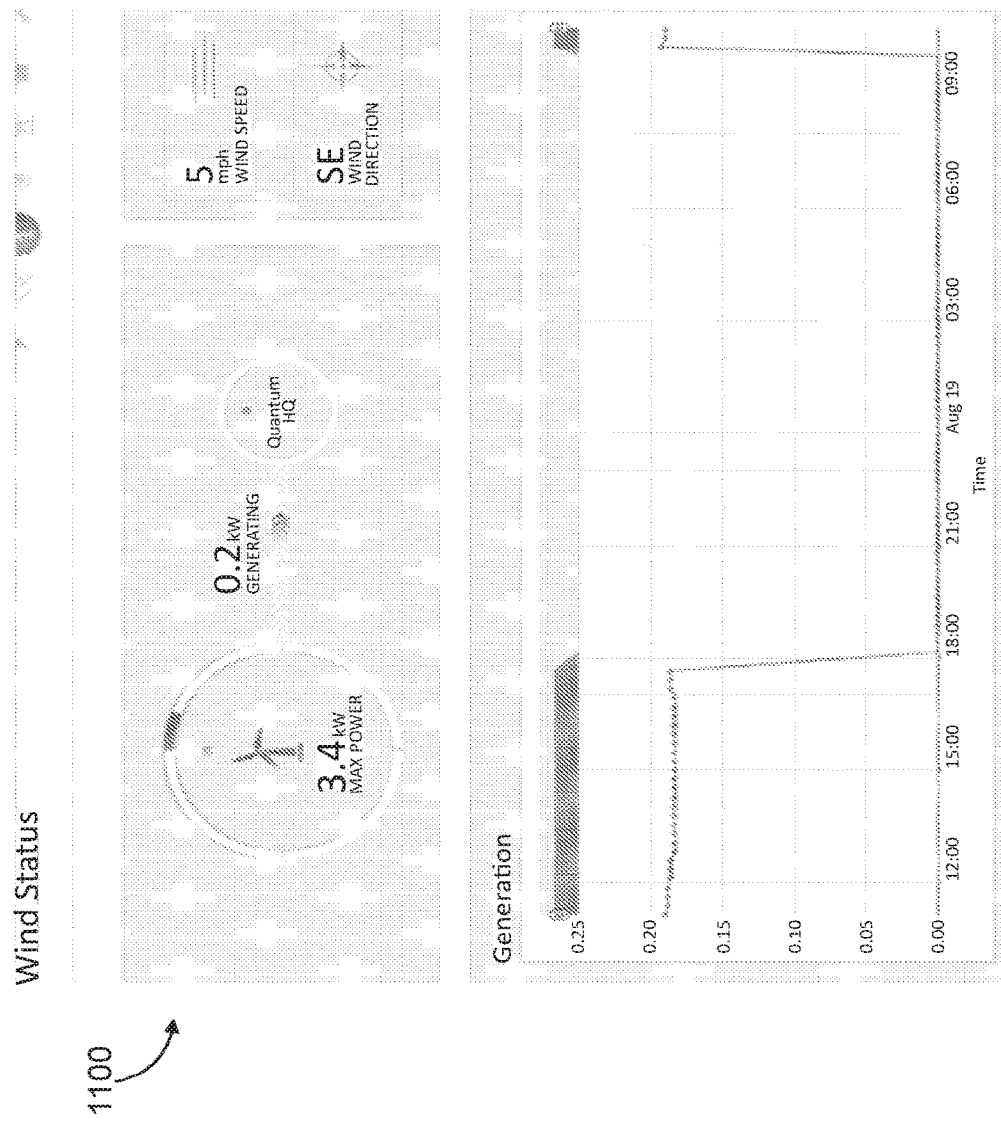
FIG. 11 is an illustration of a graphical user interface for a graph of generated wind energy over time, real-time wind speed, and real-time wind direction in accordance with an illustrative embodiment.

FIG. 11 is an illustration of a graphical user interface for a graph of generated wind energy over time, real-time wind speed, and real-time wind direction in accordance with an illustrative embodiment. An illustrative dashboard 1100 shows a graph of energy being provided by wind over time, real-time wind speed, and real-time wind direction. In alternative embodiments, additional, fewer, and/or different elements may be used.

Figure 12:
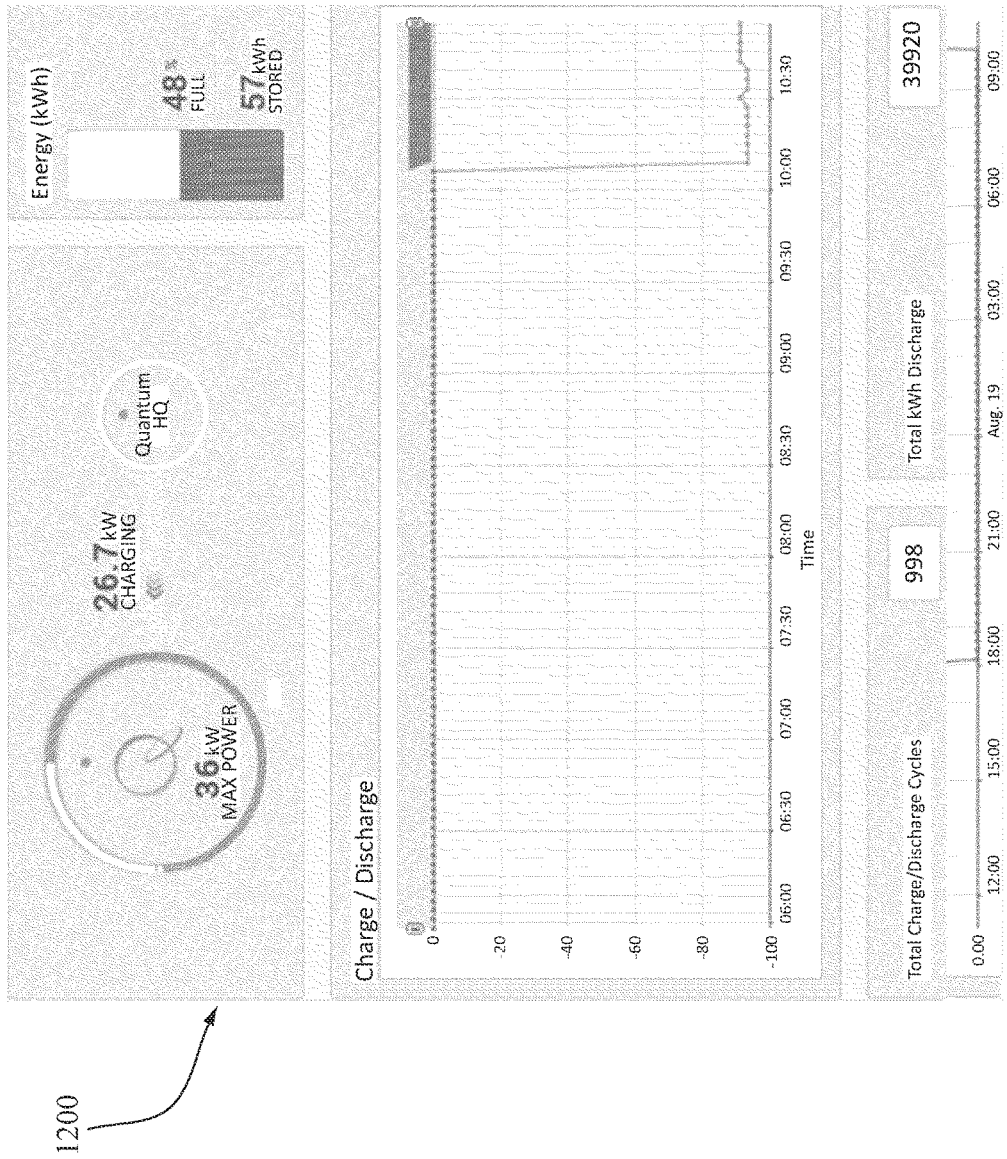
FIG. 12 is an illustration of a graphical user interface for a graph of charge and discharge of power over time, storage capacity, total number of charge and discharge cycles, and total kWh discharged in accordance with an illustrative embodiment.

FIG. 12 is an illustration of a graphical user interface for a graph of charge and discharge of power over time, storage capacity, total number of charge and discharge cycles, and total kWh discharged in accordance with an illustrative embodiment. An illustrative dashboard 1200 shows storage information including a graph of charge and discharge of power of a flywheel 220 over time, storage capacity, total number of charge and discharge cycles, and total energy discharged. In alternative embodiments, additional, fewer, and/or different elements may be used.

Figure 13:
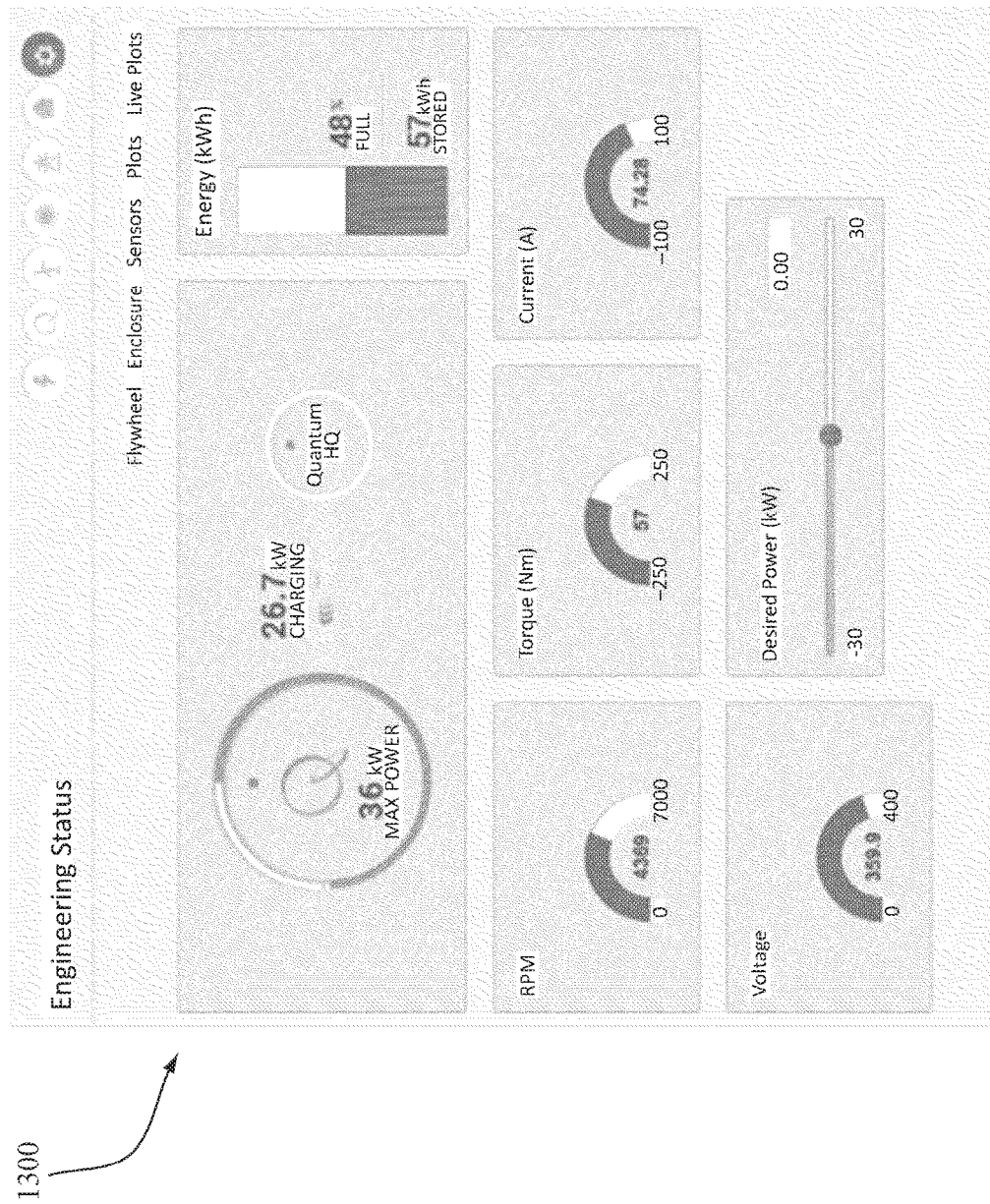
FIG. 13 is an illustration of a graphical user interface of an engineering page showing motor information including maximum power, speed, voltage, current, power, and storage capacity in accordance with an illustrative embodiment.

FIG. 13 is an illustration of a graphical user interface of an engineering page showing motor information including power, speed, voltage, current, maximum power, and storage capacity in accordance with an illustrative embodiment. An illustrative dashboard 1300 shows an engineering interface showing motor information including maximum power, speed, voltage, current, power, and storage capacity. In alternative embodiments, additional, fewer, and/or different elements may be used.

Figure 14:
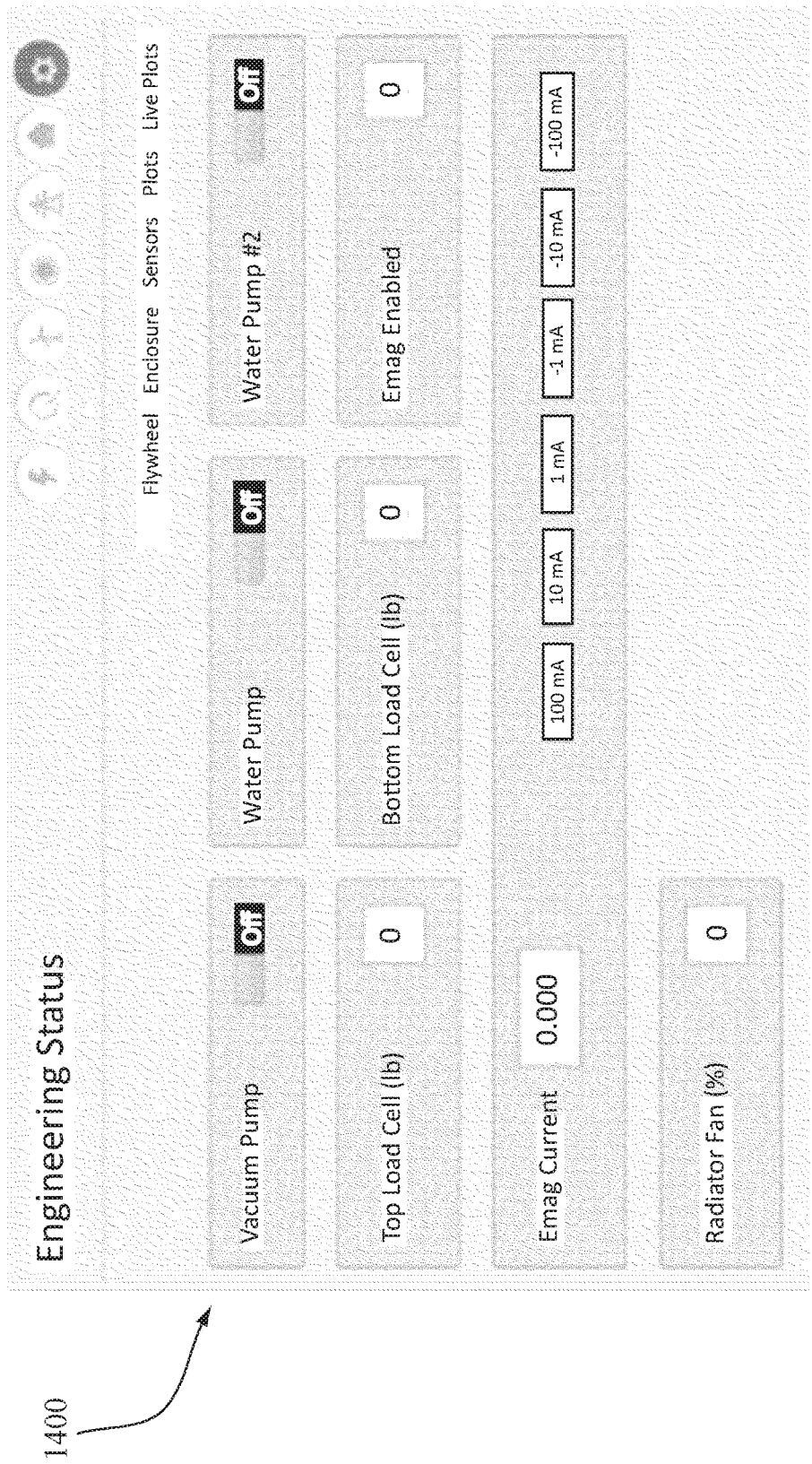
FIG. 14 is an illustration of a graphical user interface of an engineering page for flywheel components in accordance with an illustrative embodiment.

FIG. 14 is an illustration of a graphical user interface of an engineering page for flywheel components in accordance with an illustrative embodiment. An illustrative dashboard 1400 shows an engineering interface with switches and buttons for controlling flywheel components including water pumps, vacuum, and an electromagnet. In alternative embodiments, additional, fewer, and/or different elements may be used.

Figure 15:
FIG. 15 is an illustration of a graphical user interface of an engineering page showing real-time sensor data in accordance with an illustrative embodiment.

FIG. 15 is an illustration of a graphical user interface of an engineering page showing real-time sensor data in accordance with an illustrative embodiment. An illustrative dashboard 1500 shows an engineering interface showing real-time sensor data. In alternative embodiments, additional, fewer, and/or different elements may be used.

Figure 16:
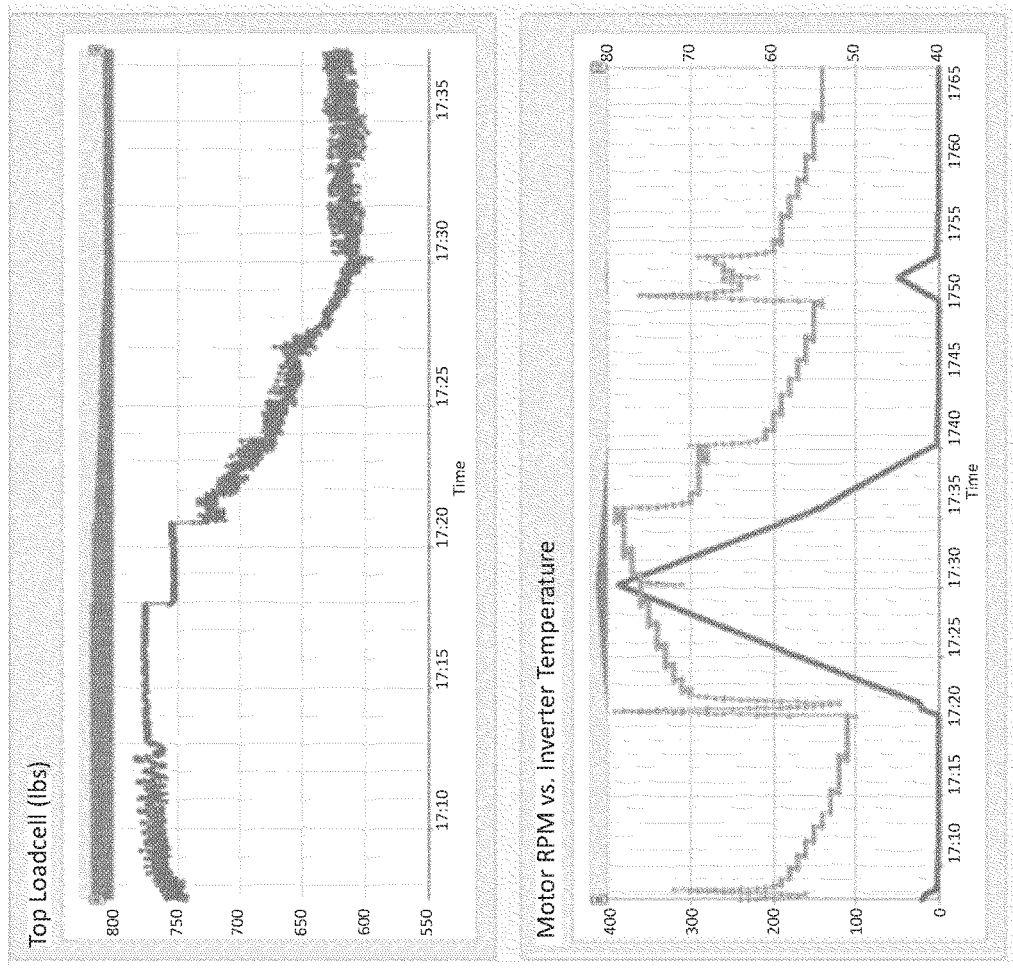
FIG. 16 is an illustration of a graphical user interface of an engineering page showing graphs of selected modules over a specified time and range in accordance with an illustrative embodiment.
Figure 16:
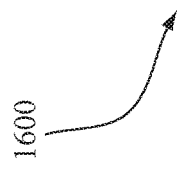

FIG. 16 is an illustration of a graphical user interface of an engineering page showing graphs of selected modules over a specified time and range in accordance with an illustrative embodiment. An illustrative dashboard 1600 shows an engineering interface showing graphs of selected modules over a specified time and range. In alternative embodiments, additional, fewer, and/or different elements may be used.

Figure 17:
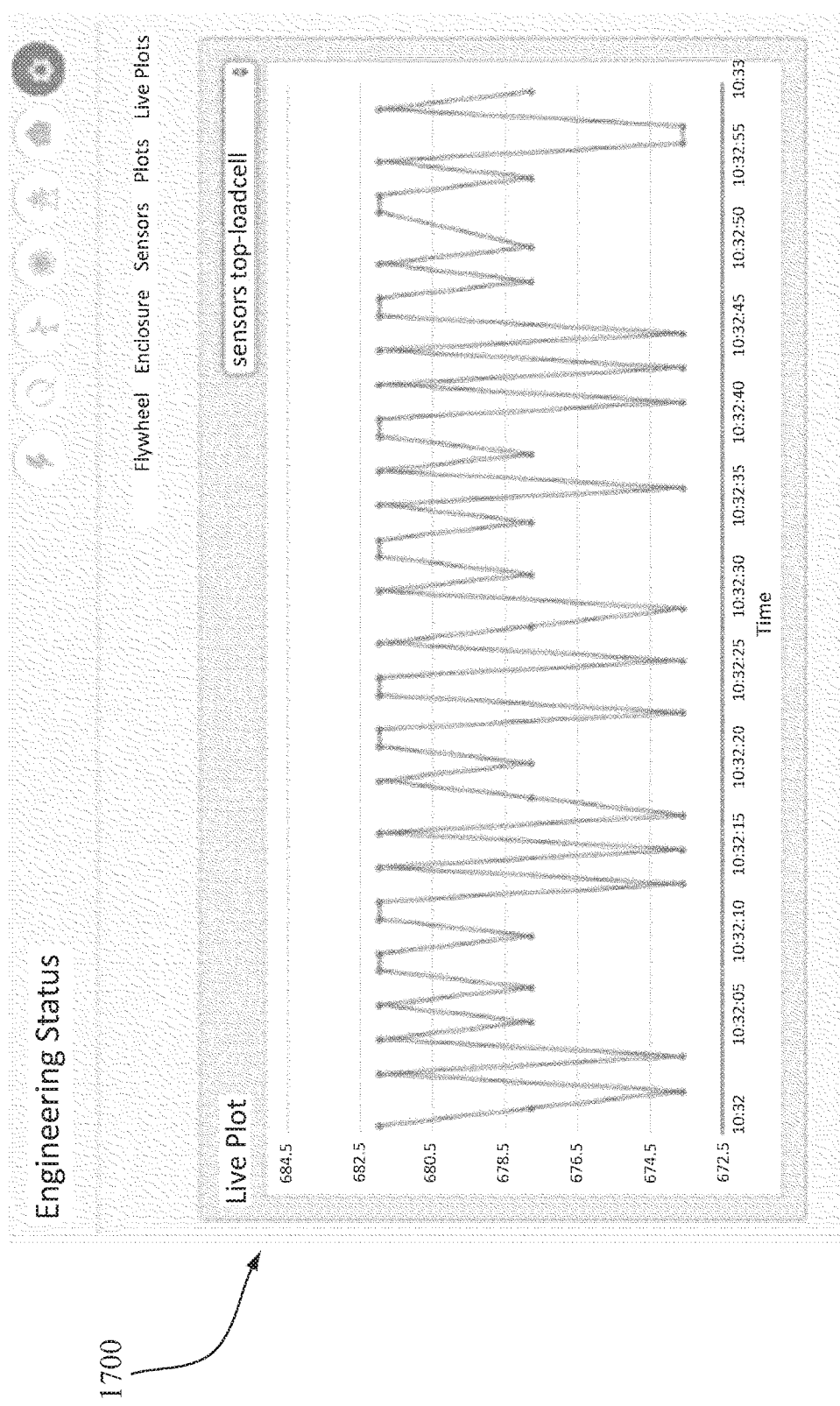
FIG. 17 is an illustration of a graphical user interface showing a real-time plot for a single module in accordance with an illustrative embodiment.

FIG. 17 is an illustration of a graphical user interface showing a real-time plot for a single module in accordance with an illustrative embodiment. An illustrative dashboard 1700 shows a real-time plot of a single module 410. In alternative embodiments, additional, fewer, and/or different elements may be used.

In an illustrative embodiment, the energy storage system 200 continually monitors all sensors and system profiles for device degradation and lifetime calculations. Because the current state of each module 410 is stored in shared memory, a power outage can cause data to be lost. For most modules 410, data lost during a relatively short amount of time (e.g., a minute, an hour, a day, etc.) is not a problem because the energy storage system 200 can interface with hardware once power has been restored to determine the current status of the hardware. For certain types of modules 410 that track metrics and keep a running log of certain values, lost data can lead to periods of time with no historical data. In an illustrative embodiment, the energy storage system 200 uses persistent metrics to track usage characteristics for the system as a whole and for each component while the characteristics are used to control the energy storage system 200 and control the power cycling the energy storage system

200. Various values can be stored in persistent modules 410 when an event is reached or on a timely basis. For example, the energy storage system 200 cycle count is stored as a persistent metric as well as total power discharge since installation. Persistent metrics can be used to calculate the life remaining of certain components. The remaining life can be used to determine that a component should have regular maintenance performed or that a component should be replaced to prevent failure of the component.

System component lifetime calculations can be estimated and, in some instances, can be imprecise. In an illustrative embodiment, if the lifetime of a component is known, the component can be utilized to its maximum potential, and maintenance can be delayed until necessary instead of maintaining the system at set intervals. In some embodiments, the energy storage system 200 continuously calculates usage of certain components for use in a maintenance schedule as a way to maximize the lifetime of the components. For example, instead of relying on tables, the energy storage system 200 accurately determines when a component is likely to fail. For instance, the bearings' lifetime can be based on load and number of revolutions. The system calculates the use of the bearings using the following equation:

$$\Sigma Load \times Revolutions^3$$

For example, each bearing cartridge has a constant usage number, and the energy management system 200 uses the usage number to determine the life remaining of the bearing. In an illustrative embodiment, the energy management system 200 measures the temperature of the bearing over time to determine if the bearing should be replaced. For example, if the temperature of the bearings exceeds a threshold for a certain amount of time, it can be determined that the bearing should be replaced.

In an illustrative embodiment, the energy storage system 200 has sensors 110 that are used to control and operate the energy storage system 200 effectively. Sensors 110 can degrade over time, and the values sensed by the sensors 110 may become slightly less accurate or inaccurate. In an illustrative embodiment, sensors 110 are replaced in defined time intervals. If a sensor 110 constantly provides incorrect values, the sensor 110 is replaced or fixed by a technician. The energy storage system 200 can continually check and monitor sensor 110 degradation over time. If the energy storage system 200 determines that a sensor 110 is inaccurate, the energy storage system 200 can ignore values received from the sensor 110 in certain conditions. The energy storage system 200 can compare historical data of the sensor 110 and determine a deviation from the mean and standard values to determine that the sensor 110 has degraded and may fail. The mean and standard deviation for each sensor 110 can be calculated and compared to the historical means and standard deviations over time. In an illustrative embodiment, the energy storage system 200 can access the mean and standard deviation of similar sensors 110 of other energy management storage systems 200 via a central server. In an illustrative embodiment, if the sensed values of a sensor 110 are beyond typical ranges, the values can be ignored in control applications, and the sensor 110 can be replaced or repaired, for example, during the next maintenance period.

In an illustrative embodiment, the entire energy storage system 200 is replaced after a certain amount of time. The energy storage system 200 can be removed from operation and repaired or maintained on a set schedule. In an illustrative embodiment, the energy storage system 200 is replaced when necessary and repair or maintenance of the system is performed when necessary. Such an embodiment can reduce costs and be more efficient because premature replacement or maintenance is not performed. In an illustrative embodiment, similar to sensor 110 degradation calculations, the energy management system 200 continuously characterizes system performance and compares the system performance with past performance and the performance of other energy management systems 200 to measure system degradation and the need for replacement or repairs. If the energy management system 200 is performing inefficiently with suboptimal efficiency values, usage of the energy management system 200 can be dynamically modified to optimize performance with modified control algorithms or device substitution. Such parameters can be automatically sent to system simulation algorithms to continuously optimize performance and efficiency. For example, air drag calculations may show a vacuum rating higher than normal. In response to such a calculation, a technician may upgrade the vacuum components of the energy storage system 200 or the energy management system 200 may stay at lower charge levels to reduce air drag loss.

In an illustrative embodiment, false sensor values can be input into the energy management system 200 (e.g., by forcing modules 410 to output a simulated value) as a way to test system performance and reaction to certain sensor parameters. In such an embodiment, the energy management system does not differentiate between a real sensor 110 value and a mocked sensor 110 value. Mocked sensor 110 values allow for rapid control algorithm testing and/or for modeling the performance of the energy management system 200 to maintain optimal use. In an illustrative embodiment, scenario simulations are performed to model current usage over time to maintain optimal usage. For example, the failure of a sensor 110 is simulated by mocking a fast rise in temperature. The energy management system 200 should respond by triggering an alarm and starting a shutdown sequence. In an illustrative embodiment, verification that the energy management system 200 triggered the alarm and started the shutdown sequence can be verified using a software simulation as opposed to a running energy management system 200. On-going testing can tie-in with modeling the entire energy storage performance characteristics.

In an illustrative embodiment, system performance and characteristics continually change throughout the lifetime of the system. Optimization calculations can be performed upon initialization and can be dynamically set throughout the lifetime of the energy storage system 200. In an illustrative embodiment, performance characteristics are continuously modeled within the energy management system 200 to dynamically optimize control algorithms and parameters and/or to extend component and system lifetimes. For example, temperature characteristics, efficiency values, and device lifetimes are calculated and used to modify control algorithm and to optimize performance. For instance, bearing force and speed of the flywheel 220 affect the temperature of the energy storage system 200. The bearing lifetime is determined based on bearing force and speed. Thus, bearing load and flywheel 220 speed are constantly adjusted to optimize temperature and, therefore, bearing lifetime. The system may stay stationary instead of staying fully charged (for a time) as a way to prolong maintenance schedules and improve lifetime. In an illustrative embodiment, such information is continuously calculated and modeled on the system and sent to a central server.

In an illustrative embodiment, the performance of an energy storage system 200 is optimized for the particular use of the energy storage system 200. For example, an energy storage system 200 is optimized for permanent load shift of energy usage from the grid 210. The characteristics of the energy storage system 200 are set without comparison to similar operation of other energy storage systems 200.

In an illustrative embodiment, the central server continuously analyzes data from multiple energy storage systems 200 for fault detection, diagnostics, and system inefficiencies. Profiling of an energy storage system 200 using historical data of the energy storage system 200 enables diagnostics and fault detection on the energy storage system 200 as a whole. In some embodiments, simulations are run at an aggregate level to optimize system characteristic algorithms and control algorithms. Sensors 110 and system diagnostics of an energy storage system 200 can be compared with similar systems for system performance. For example, an efficiency matrix for one energy storage system 200 shows less efficiency than other, comparable energy storage systems 200, and it may be determined that the motor may have degraded or needs replacement.

In an illustrative embodiment, the energy storage system 200 can keep users (e.g., operators) informed about the status of the energy storage system 200. Status updates can be performed using any suitable method, such as via a dashboard or a widget. For example, an update can be informative or can act as a way to notify users of unusual activity. Such updates can be used during times that the system is unattended and the user should be informed that the energy storage system 200 is malfunctioning.

In an illustrative embodiment, the energy storage system 200 connects to the Internet and sends periodic snapshots of the energy storage system 200 to users. Any suitable method can be used to notify users, such as via email. In an illustrative embodiment, each snapshot includes the current state of each module 410 and can also include historical information in the form of plots and charts. For example, the subject line of a notification email can contain pertinent information such as motor speed. Such an email makes it convenient for a user to browse through a list of system updates. In an illustrative embodiment, emails may originate from the energy storage system 200. In an alternative embodiment, an outside server is used to transmit the emails. In some instances, using an outside server is a secure option because the credentials needed to send the email may not be stored directly on the energy storage system 200. The outside server may limit the rate and amount of email messages that an energy storage system 200 can send. For example, if an energy storage system 200 has been compromised, access to the email service can be revoked by the outside server. Such messages can be sent periodically or triggered based on specific characteristics of the system (e.g., speed, temperature, etc.). Users can disable updates during times when the system is inactive or disabled, for example, to reduce alarm fatigue.

Any suitable method of notification can be used. For example, the energy storage system can trigger a more urgent type of notification when certain negative criteria are reached. In an illustrative embodiment, such messages are narrower in scope and alternative mediums can be used to deliver the message (e.g., via text message).

In an illustrative embodiment, the energy storage system 200 provides for the regulation of operations to manage levels of energy availability and costs. In addition to the features described above, the energy storage system 200 can be used for AC voltage and phase regulation in some embodiments. In some instances, the electric grid 210 does not maintain a steady phase and voltage because of fluctuations in supply and demand. With the increase of renewable energy on the grid 210, the utility may experience an increase in fluctuations that can cause disruptions on the grid 210 such as blackouts, brownouts, and loss of generation. For example, an inverter or transformer automatically shuts off if the voltage is outside of a predefined threshold. Any suitable method of maintaining voltage can be used. Some methods may lead to a lower power factor, so the entire system is less efficient than maintaining a power factor close to 1.

In an illustrative embodiment, the energy storage system 200 is an automatic AC voltage regulator when the system is set in a regulation mode. The energy storage system 200 sets the control mode on an inverter and power electronics and sets thresholds based on performance characteristics. For example, the energy storage system 200 sets the inverter modes for multiple flywheels 220 in parallel to optimize flywheel 220 performance and prevent two (or more) systems from controlling the same DC voltage line. The energy storage system 200 can automatically charge and discharge the flywheels 220 based on grid 210 conditions to regulate AC voltage of the grid 210 or of the user's electrical system. In an illustrative embodiment, each energy storage system 200 monitors and regulates a certain setting.

Figure 18:
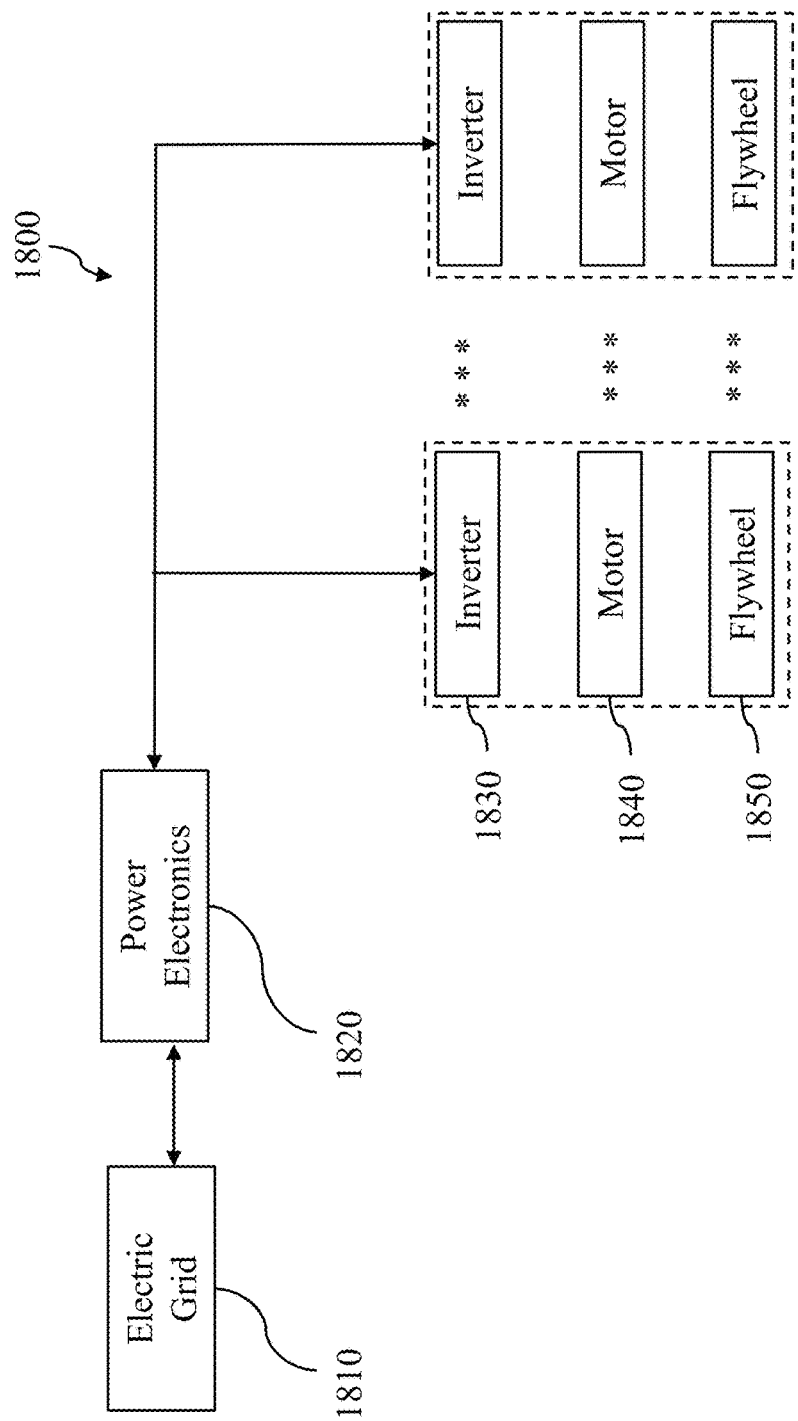
FIG. 18 is a block diagram depicting an energy storage system connected to an electric grid in accordance with an illustrative embodiment.

FIG. 18 is a block diagram depicting an energy storage system connected to an electric grid in accordance with an illustrative embodiment. An illustrative system 1800 includes an electrical grid 1810, power electronics 1820, multiple inverters 1830, multiple motors 1840, and multiple flywheels 1850. In alternative embodiments, additional, fewer, and/or different elements may be used.

In an illustrative embodiment, the power electronics 1820 monitor and regulate the AC voltage and current of the electric grid 1810. An inverter 1830 maintains constant voltage on the DC line by controlling the torque sent to a motor 1840. The torque is set and maintained by a flywheel 1850. The motor 1840 charges or discharges the flywheel 1850 based on torque from the motor 1840. Power fluctuations on the AC voltage line change the DC voltage, which will automatically cause the inverter 1830 to send torque commands to the motor 1840. The torque commands will charge or discharge the flywheel 1850. For example, if the voltage of the electric grid 1810 is above a predefined threshold, the DC voltage line increases with the excess voltage. The inverter, in turn, increases torque on the motor 1840, which charges the flywheel 1850. The motor 1840 continually increases torque until the voltage reaches the predefined value. Once the predefined voltage is reached, the AC voltage line and phase will be at the predefined value. The increase in AC grid voltage causes the flywheel 1850 to charge and, in turn, the AC voltage is lowered to its regulated value. The power electronics 1820 can also regulate AC phase in addition to voltage.

In some embodiments, the power electronics 1820 may only regulate voltage or phase, but not both without the use of a generator or storage. A constant voltage and variable phase may lead to losses on the grid because the power factor decreases.

In some embodiments, the energy storage system 200 regulates AC voltage and phase. The energy storage system 200 monitors the active and reactive power on the electric grid 1810 and adds active or reactive power to the AC line to maximize the power factor. If power is required on the AC line, the flywheel 1850 discharges. If there is too much power on the AC line, the flywheel 1850 charges. In such an embodiment, the electric grid 1810 maintains a constant desired power with a high, desirable power factor.

Figure 19:
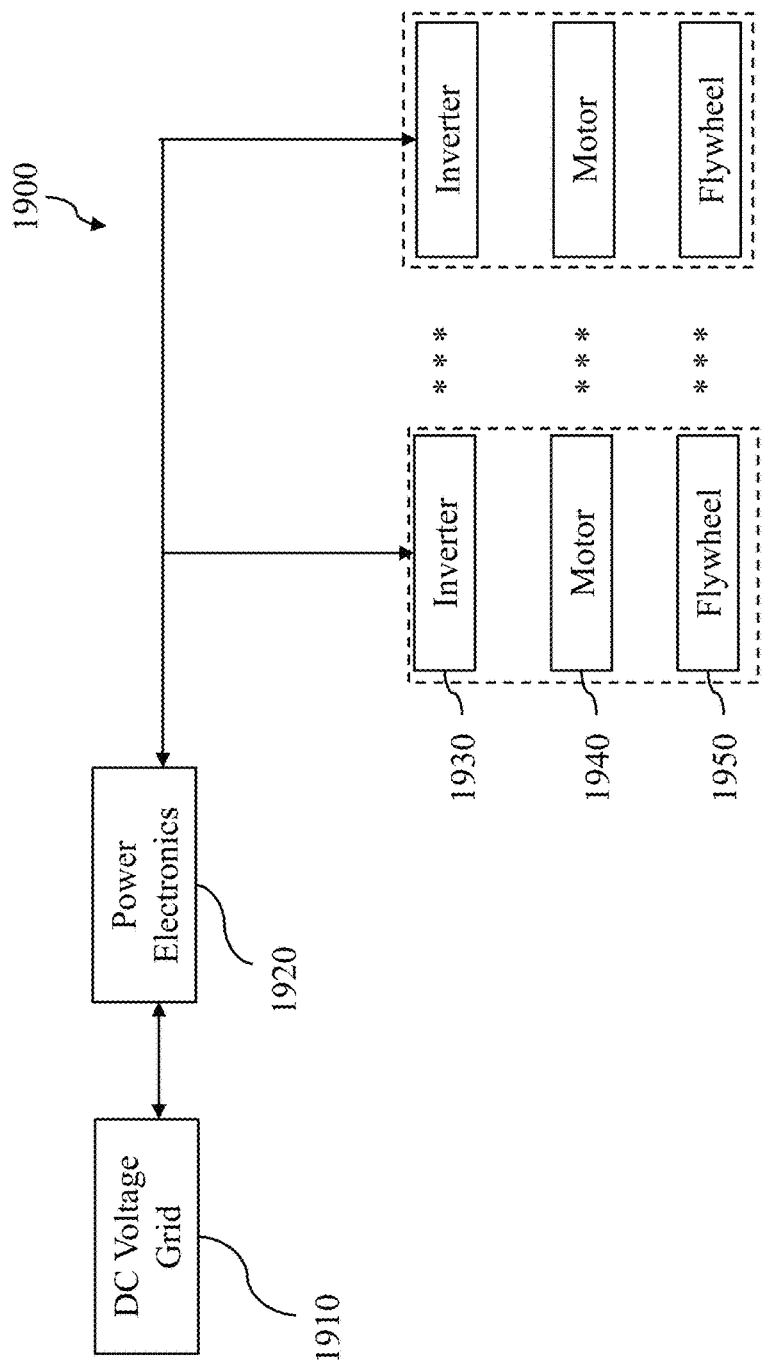
FIG. 19 is a block diagram depicting DC voltage regulation with a flywheel energy storage system in accordance with an illustrative embodiment.

FIG. 19 is a block diagram depicting DC voltage regulation with a flywheel energy storage system in accordance with an illustrative embodiment. An illustrative system 1900 includes a DC voltage grid 1910, power electronics 1920, multiple inverters 1920, multiple motors 1940, and multiple flywheels 1950. In alternative embodiments, additional, fewer, and/or different elements may be used. In an illustrative embodiment, voltage fluctuations on a DC voltage grid 1910 leads to inefficiencies and loss of power. The DC voltage grid 1910 fluctuates based on supply and demand, and renewable energy sources cause fluctuations in the DC voltage grid 1910 more than a system 1900 without renewable energy sources. In an illustrative embodiment, the energy storage system 200 automatically regulates the DC voltage by adjusting torque on the motor 1940, and the energy storage system 200 sets the inverter 1930 to the correct modes based on the number of flywheels 1950 and the performance characteristics of each flywheel 1950.

In an illustrative embodiment, any of the operations described herein can be implemented at least in part as computer-readable instructions stored on a computer-readable medium or memory. Upon execution of the computer-readable instructions by a processor, the computer-readable instructions can cause a computing device to perform the operations.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The herein-described subject matter sometimes illustrates different components contained within, or connected with, other different components. It is to be understood that such depicted architectures are merely exemplary and that, in fact, many other architectures can be implemented that achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include, but are not limited to, physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including, but not limited to"; the term "having" should be interpreted as "having at least"; the term "includes" should be interpreted as "includes, but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include, but not be limited to, systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An energy storage system comprising:
   a flywheel device comprising:
      a housing section;
      a rotor disposed within the housing section;
      lower contact bearings and upper contact bearings, each disposed between the rotor and the housing; and
      an off-loading magnet configured to provide a vertical off-loading force that lifts the rotor against the upper bearings and off of the lower bearings;
   a processor coupled to the flywheel device;
   a plurality of sensors; and
   a memory coupled to the processor, the memory comprising:
      a first memory space configured to store instructions adapted for execution by the processor to control and monitor operation of the flywheel device; and
      a shared memory space configured to:
         write values received from a plurality of modules, wherein each module is associated with one of the plurality of sensors; and
         read the values received from the plurality of modules to the processor while one or more of the plurality of modules is communicatively de-coupled from the shared memory space without interrupting the operation of the flywheel device.

2. The system of claim 1, wherein the processor is configured to send a signal to pre-load the vertical off-loading force.

3. The system of claim 1, wherein the processor is configured to adjust the off-loading magnet based on unique characteristics of the rotor.

4. The system of claim 1, further comprising a motor coupled to the rotor, wherein the processor is configured to modulate torque of the motor.

5. The system of claim 1, wherein the processor is configured to schedule maximum charge and discharge of the flywheel device based on pseudorandom numbers.

6. The system of claim 1, wherein the processor is configured to schedule maximum charge of the flywheel device at night and discharge of the flywheel device during the day.

7. The system of claim 1, further comprising a user interface configured to facilitate control and monitoring of the flywheel device.

\* \* \* \* \*